US011274575B2

United States Patent
Uechi et al.

(10) Patent No.: US 11,274,575 B2
(45) Date of Patent: Mar. 15, 2022

(54) GAS TURBINE PLANT AND OPERATION METHOD THEREFOR

(71) Applicant: MITSUBISHI HEAVY INDUSTRIES, LTD., Tokyo (JP)

(72) Inventors: Hideyuki Uechi, Tokyo (JP); Tatsuo Ishiguro, Tokyo (JP); Naoki Hisada, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 325 days.

(21) Appl. No.: 16/088,259

(22) PCT Filed: Mar. 8, 2017

(86) PCT No.: PCT/JP2017/009252
§ 371 (c)(1),
(2) Date: Sep. 25, 2018

(87) PCT Pub. No.: WO2017/169594
PCT Pub. Date: Oct. 5, 2017

(65) Prior Publication Data
US 2020/0332681 A1    Oct. 22, 2020

(30) Foreign Application Priority Data

Mar. 29, 2016 (JP) .............................. JP2016-065790

(51) Int. Cl.
*F01K 23/10* (2006.01)
*F01K 7/32* (2006.01)
(Continued)

(52) U.S. Cl.
CPC .............. *F01K 23/101* (2013.01); *F01K 7/32* (2013.01); *F01K 23/10* (2013.01); *F01K 25/10* (2013.01);
(Continued)

(58) Field of Classification Search
CPC ........ F01K 23/10; F01K 25/10; F01K 17/025; F02C 6/18; F05D 2220/72; F05D 2220/722; Y02E 20/16
See application file for complete search history.

(56) References Cited

U.S. PATENT DOCUMENTS 3,150,487 A * 9/1964 Mangan ................ F01K 23/106
60/39.182
4,961,311 A * 10/1990 Pavel ........................ F01K 9/02
60/39.182
(Continued)

FOREIGN PATENT DOCUMENTS

DE    102011054744    5/2012
EP      0 908 602    4/1999
(Continued)

OTHER PUBLICATIONS

International Search Report dated May 30, 2017 in corresponding International Application No. PCT/JP2017/009252.
(Continued)

*Primary Examiner* — Jesse S Bogue
(74) *Attorney, Agent, or Firm* — Wenderoth, Lind & Ponack, L.L.P.

(57) ABSTRACT

A gas turbine plant includes a gas turbine, an exhaust heat recovery boiler, and a water supply system that is configured to supply water to the exhaust heat recovery boiler. The exhaust heat recovery boiler has an evaporator configured to use an exhaust gas to heat water, thereby generating steam, and a reheater that is configured to heat steam with the exhaust gas introduced from the evaporator. The water supply system has a water supply line that is configured to supply water from a water supply source to the exhaust heat recovery boiler, and a supplied water temperature regulator
(Continued)

that is configured to regulate a temperature of supplied water, which is the water in the water supply line.

12 Claims, 15 Drawing Sheets

(51) Int. Cl.
```
F01K 25/10      (2006.01)
F02C 7/18       (2006.01)
F02G 5/02       (2006.01)
F02G 5/04       (2006.01)
H02K 7/18       (2006.01)
```

(52) U.S. Cl.
CPC ............... *F02C 7/18* (2013.01); *F02G 5/02* (2013.01); *F02G 5/04* (2013.01); *H02K 7/18* (2013.01)

(56) References Cited

U.S. PATENT DOCUMENTS

| | | | |
|---|---|---|---|
| 6,141,952 A | 11/2000 | Bachmann et al. | |
| 7,874,162 B2 | 1/2011 | Tomlinson et al. | |
| 9,470,112 B2* | 10/2016 | Gardiner | F01K 7/26 |
| 10,126,048 B2* | 11/2018 | Nagao | F25J 1/0259 |
| 10,480,411 B2* | 11/2019 | Uechi | F02C 6/18 |
| 2001/0027642 A1 | 10/2001 | Tsuji | |
| 2006/0197345 A1* | 9/2006 | Kuroki | F16D 27/04 290/1 A |
| 2007/0017207 A1* | 1/2007 | Smith | F01K 21/047 60/39.182 |
| 2009/0090111 A1* | 4/2009 | Tomlinson | F01K 23/106 60/783 |
| 2009/0320828 A1 | 12/2009 | Koketsu et al. | |
| 2012/0102962 A1* | 5/2012 | Sivasankaran | F01K 23/10 60/772 |
| 2015/0075133 A1* | 3/2015 | Tanimura | F02C 6/18 60/39.181 |
| 2017/0074164 A1 | 3/2017 | Uechi et al. | |
| 2017/0152765 A1* | 6/2017 | Uechi | F01K 25/10 |

FOREIGN PATENT DOCUMENTS

| | | |
|---|---|---|
| EP | 2385223 | 11/2011 |
| EP | 3 124 758 | 2/2017 |
| JP | 56-18008 | 2/1981 |
| JP | 6-212909 | 8/1994 |
| JP | 8-121703 | 5/1996 |
| JP | 11-270352 | 10/1999 |
| JP | 2004-36535 | 2/2004 |
| JP | 2007-23976 | 2/2007 |
| JP | 2007-64049 | 3/2007 |
| JP | 2008-121483 | 5/2008 |
| JP | 2009-92372 | 4/2009 |
| JP | 2012-117517 | 6/2012 |
| JP | 2015-48796 | 3/2015 |
| JP | 2015-183590 | 10/2015 |
| JP | 2015-183594 | 10/2015 |
| JP | 2015-183595 | 10/2015 |
| WO | WO-2015155818 A1 * | 10/2015 ............ F25J 1/0022 |

OTHER PUBLICATIONS

Written Opinion of the International Searching Authority dated May 30, 2017 in corresponding International Application No. PCT/JP2017/009252 (with English translation).

* cited by examiner

GAS TURBINE PLANT AND OPERATION METHOD THEREFOR

CROSS-REFERENCE TO RELATED APPLICATION

Priority is claimed from Japanese Patent Application No. 2016-065790, filed Mar. 29, 2016, the content of which is incorporated herein by reference.

TECHNICAL FIELD

The present invention relates to a gas turbine plant having a gas turbine and an exhaust heat recovery boiler, and an operation method therefor.

BACKGROUND ART

Gas turbine plants include a plant that has a gas turbine and an exhaust heat recovery boiler that uses an exhaust gas from the gas turbine to generate steam.

Among such gas turbine plants, there is a plant disclosed in, for instance, Japanese Unexamined Patent Application, First Publication No. 2009-092372 (hereinafter, "JP 2009-092372"). An exhaust heat recovery boiler of this plant has a low-pressure economizer, a low-pressure evaporator, a first high-pressure economizer, a first low-pressure superheater, a first reheater, a second high-pressure economizer, a second low-pressure superheater, a high-pressure evaporator, a first high-pressure superheater, a second reheater, a second high-pressure superheater, and a high-pressure pump. The low-pressure economizer, the low-pressure evaporator, the first high-pressure economizer, the first low-pressure superheater, the first reheater, the second low-pressure superheater, the high-pressure evaporator, the first high-pressure superheater, the second reheater, and the second high-pressure superheater are arranged from a downstream side of an exhaust gas toward an upstream side thereof in this order. The second high-pressure economizer is disposed at the same position as the first reheater in an upstream/downstream direction of the flow of the exhaust gas.

The low-pressure economizer heats water from the outside with the exhaust gas. The low-pressure evaporator heats the heated water from the low-pressure economizer with the exhaust gas, and generates low-pressure steam. The high-pressure pump boosts a pressure of the heated water from the low-pressure economizer. The first high-pressure economizer heats the heated water, the pressure of which is boosted by the high-pressure pump, with the exhaust gas. The first low-pressure superheater superheats the low-pressure steam with the exhaust gas. The first reheater heats exhaust steam exhausted from the intermediate-pressure steam turbine. The second high-pressure economizer further heats the heated water heated by the first high-pressure economizer. The second low-pressure superheater further superheats the low-pressure steam superheated by the first low-pressure superheater, and sends this low-pressure superheated steam to the low-pressure steam turbine. The high-pressure evaporator uses the exhaust gas to heat the heated water heated by the second high-pressure economizer, and generates high-pressure steam. The first high-pressure superheater superheats the high-pressure steam with the exhaust gas. The second reheater further superheats the steam heated by the first reheater with the exhaust gas, and sends this superheated steam to the intermediate-pressure steam turbine. The second high-pressure superheater further superheats the high-pressure steam superheated by the first high-pressure superheater, and sends it to the high-pressure steam turbine as high-pressure superheated steam.

To effectively use heat of the exhaust gas in the exhaust heat recovery boiler, a plurality of types of steam having pressures different from each other are generated.

SUMMARY OF INVENTION

Technical Problem

To effectively use the heat of the exhaust gas in the exhaust heat recovery boiler, the heat of the exhaust gas is preferably used until a temperature of the exhaust gas is made as low as possible. Meanwhile, when the temperature of the exhaust gas becomes too low, NOx or SOx contained in the exhaust gas is condensed into a nitric acid solution or a sulfuric acid solution, and a flue or the like may be corroded by these corrosive solutions. For this reason, in terms of effective use of the heat of the exhaust gas and protection of a flue or the like, an adequate temperature is required for the temperature of the exhaust gas exhausted from the exhaust heat recovery boiler.

In the exhaust heat recovery boiler disclosed in JP 2009-092372, a reheater is disposed at a downstream side of the high-pressure evaporator. Since exhaust steam exhausted from the intermediate-pressure steam turbine flows into the reheater, it is difficult to regulate the temperature of the exhaust gas in the reheater. For this reason, it is difficult to regulate the temperature of the exhaust gas in the low-pressure evaporator or the like disposed at a downstream side from this reheater.

Therefore, the present invention is directed to providing a gas turbine plant capable of, even in an exhaust heat recovery boiler in which a reheater is disposed at a downstream side of an evaporator, regulating a temperature of an exhaust gas exhausted from the exhaust heat recovery boiler, and an operation method therefor.

Solution to Problem

To achieve the object, a gas turbine plant as an aspect according to the present invention includes: a gas turbine, an exhaust heat recovery boiler configured to generate steam using heat of an exhaust gas from the gas turbine; and a water supply system configured to supply water to the exhaust heat recovery boiler. The exhaust heat recovery boiler has an evaporator that is configured to heat the water with the exhaust gas and generate steam, and a reheater that is configured to heat the steam from outside with the exhaust gas passing through the evaporator, and the water supply system has a water supply line that is configured to send water from a water supply source to the exhaust heat recovery boiler, and a supplied water temperature regulator that is configured to regulate a temperature of supplied water that is the water flowing along the water supply line.

The temperature of the supplied water flowing into the exhaust heat recovery boiler is regulated in the gas turbine plant, and thereby the temperature of an exhaust gas exhausted from the exhaust heat recovery boiler can be regulated.

Here, in the gas turbine plant, the supplied water temperature regulator may have a supplied water heater that is configured to heat the supplied water.

In the gas turbine plant, even when a temperature of the water from the water supply source is low, the supplied water can be heated by the supplied water heater, so that the temperature of the supplied water flowing into the exhaust heat recovery boiler can be set to a target temperature.

In the gas turbine plant having the supplied water heater, the gas turbine may have a compressor that is configured to compress air, a combustor that is configured to burn fuel in the air compressed by the compressor and generate a combustion gas, and a turbine that is driven by the combustion gas, and the supplied water heater may have a heat transfer device that is configured to transfer heat to the supplied water from a cooling target in the gas turbine, cools the cooling target, and heat the supplied water.

In the gas turbine plant, heat from the cooling target in the gas turbine can be effectively used.

In the gas turbine plant having the heat transfer device, the heat transfer device may include at least one of: a cooling air cooler in which part of the compressed air from the compressor is used as the cooling target, and that is configured to exchange heat with the supplied water to cool the compressed air and send the compressed air that cools high-temperature components exposed to the combustion gas in the gas turbine; an intake air cooler in which the air drawn in by the compressor is used as the cooling target, and that is configured to transfer heat from the air to the supplied water to cool the air and send the cooled air to the compressor; and a lubricant cooler in which a lubricant from a bearing that is configured to rotatably support a rotor of the gas turbine is used as the cooling target, and that is configured to exchange heat with the supplied water to cool the lubricant and return the cooled lubricant to the bearing.

In the gas turbine plant, heat obtained by cooling the air sent to the high-temperature components, heat obtained by cooling the air drawn in by the compressor, or heat obtained by cooling the lubricant can be effectively used.

In any one of the gas turbine plants having the supplied water heater, the gas turbine plant may include a generator configured to generate electricity by driving the gas turbine, and the supplied water heater may have a generator cooler that is configured to allow heat exchange between a cooling medium that cools components of the generator and the supplied water, and cool the cooling medium.

In the gas turbine plant, heat obtained by cooling the generator can be effectively used.

In any one of the gas turbine plants having the supplied water heater, the gas turbine plant may further include steam turbines driven by steam generated by the exhaust heat recovery boiler, and a generator configured to generate electricity by driving the steam turbines. The supplied water heater may include at least one of: a lubricant cooler that is configured to allow heat exchange between a lubricant from a bearing that is configured to rotatably support a rotor for the steam turbines and the supplied water, cool the lubricant, and return the cooled lubricant to the bearing; a generator cooler that is configured to allow heat exchange between the cooling medium that cools the components of the generator and the supplied water, and cool the cooling medium; and a steam cooler that is configured to allow heat exchange between steam extracted from the steam turbine and the supplied water.

In the gas turbine plant, the heat obtained by cooling the lubricant, the heat obtained by cooling the generator, or the heat obtained by cooling the steam can be effectively used.

In any one of the gas turbine plants having the supplied water heater, the supplied water heater may have an external heater that is configured to heat the supplied water using a heat source outside the gas turbine plant.

In the gas turbine plant, since the heat source outside the gas turbine plant is used, the gas turbine plant and its outside can be combined to increase heat utilization efficiency as a whole.

In any one of the gas turbine plants, the supplied water temperature regulator may have a supplied water cooler that is configured to cool the supplied water.

In the gas turbine plant, even when the temperature of the water from the water supply source is increased, the supplied water is cooled by the supplied water cooler, and the temperature of the supplied water flowing into the exhaust heat recovery boiler can be set to a target temperature. When the supplied water heater and the supplied water cooler are provided, even when the temperature of the water from the water supply source is raised or lowered, the temperature of the supplied water flowing into the exhaust heat recovery boiler can be set to a target temperature.

In the gas turbine plant having the supplied water cooler, the supplied water cooler may have a heat absorbing device that is configured to absorb heat from boiler circulation water that is water flowing through the exhaust heat recovery boiler, make the temperature of the boiler circulation water lower than the temperature of the water of the water supply source, and mix the boiler circulation water into the supplied water.

In any one of the gas turbine plants, the supplied water temperature regulator may have a heat absorbing device that is configured to absorb heat from boiler circulation water that is water flowing through the exhaust heat recovery boiler, reduce a temperature of the boiler circulation water, and mix the boiler circulation water into the supplied water.

In any one of the gas turbine plants having the heat absorbing device, the heat absorbing device may have a low-boiling-point medium Rankine cycle in which a low-boiling-point medium circulates through repeated condensation and evaporation, and the low-boiling-point medium Rankine cycle may have an evaporator that is configured to allow heat exchange between the boiler circulation water and the low-boiling-point medium that is a liquid, and heat and evaporate the low-boiling-point medium that is a liquid while cooling the boiler circulation water.

In the gas turbine plant, heat of the boiler circulation water can be effectively used.

In any one of the gas turbine plants, the exhaust heat recovery boiler may have only a high-pressure evaporator as the evaporator, and the high-pressure evaporator may be an evaporator that is configured to heat water having a temperature, which is lower than or equal to a constant-pressure specific heat maximum temperature at which a constant-pressure specific heat is a maximum under a predetermined pressure, to a temperature that is higher than or equal to the constant-pressure specific heat maximum temperature.

To achieve the object, an operation method for a gas turbine plant as an aspect according to the present invention is an operation method for a gas turbine plant that includes a gas turbine, an exhaust heat recovery boiler configured to generate steam using heat of an exhaust gas from the gas turbine, and a water supply system configured to supply water to the exhaust heat recovery boiler, wherein the exhaust heat recovery boiler has an evaporator that is configured to heat the water with the exhaust gas and generate steam, and a reheater that is configured to heat the steam from outside with the exhaust gas passing through the evaporator, and the water supply system having a water supply line that is configured to send water from a water supply source to the exhaust heat recovery boiler, and includes performing a supplied water temperature regulating process of regulating a temperature of supplied water that is the water flowing along the water supply line.

Here, in the operation method for a gas turbine plant, the supplied water temperature regulating process may include a supplied water heating process of heating the supplied water.

In the operation method for a gas turbine plant which includes the supplied water heating process, the gas turbine may have a compressor that is configured to compress air, a combustor that is configured to burn fuel in the air compressed by the compressor and generate a combustion gas, and a turbine that is driven by the combustion gas, and the supplied water heating process may include a heat transferring process of transferring heat to the supplied water from a cooling target in the gas turbine, cooling the cooling target, and heating the supplied water.

In the operation method for a gas turbine plant which includes the heat transferring process, the heat transferring process may include at least one of: a cooling air cooling process of using part of the compressed air from the compressor as the cooling target, exchanging heat with the supplied water to cool the compressed air, and sending the compressed air that cools high-temperature components exposed to the combustion gas in the gas turbine; an intake air cooling process of using the air drawn in by the compressor as the cooling target, transferring heat from the air to the supplied water to cool the air, and sending the cooled air to the compressor; and a lubricant cooling process of using a lubricant from a bearing that is configured to rotatably support a rotor of the gas turbine as the cooling target, exchanging heat with the supplied water to cool the lubricant, and returning the cooled lubricant to the bearing.

In any one of the operation methods for a gas turbine plant which includes the supplied water heating process, the gas turbine plant may include a generator configured to generate electricity by driving the gas turbine, and the supplied water heating process may include a generator cooling process of exchanging heat between a cooling medium that cools components of the generator and the supplied water, and cools the cooling medium.

In any one of the operation methods for a gas turbine plant which includes the supplied water heating process, the gas turbine plant may include steam turbines driven by steam generated by the exhaust heat recovery boiler, and a generator configured to generate electricity by driving the steam turbines, and the supplied water heating process may include at least one of a lubricant cooling process of allowing heat exchange between a lubricant from a bearing that is configured to rotatably support a rotor for the steam turbines and the supplied water, cooling the lubricant, and returning the cooled lubricant to the bearing, a generator cooling process of exchanging heat between the cooling medium that cools the components of the generator and the supplied water, and cooling the cooling medium, and a steam cooling process of exchanging heat between steam extracted from the steam turbine and the supplied water.

In any one of the operation methods for a gas turbine plant which includes the supplied water heating process, the supplied water heating process may include an external heating process of heating the supplied water using a heat source outside the gas turbine plant.

In any one of the operation methods for a gas turbine plant which includes the supplied water heating process, the supplied water temperature regulating process may include a supplied water cooling process of cooling the supplied water.

In any one of the operation methods for a gas turbine plant which includes the supplied water heating process, the supplied water cooling process may include a heat absorbing process of absorbing heat from boiler circulation water that is water flowing through the exhaust heat recovery boiler, making a temperature of the boiler circulation water lower than a temperature of the water of the water supply source, and mixing the boiler circulation water into the supplied water.

In any one of the operation methods for a gas turbine plant, the supplied water temperature regulating process may include a heat absorbing process of absorbing heat from boiler circulation water that is water flowing through the exhaust heat recovery boiler, reducing a temperature of the boiler circulation water, and mixing the boiler circulation water into the supplied water.

In any one of the operation methods for a gas turbine plant which includes the heat absorbing process, the heat absorbing process may include a Rankine cycle performing process of circulating a low-boiling-point medium in a low-boiling-point medium Rankine cycle, and the Rankine cycle performing process may include an evaporating process of exchanging heat between the boiler circulation water and the low-boiling-point medium that is a liquid, and heating and evaporating the low-boiling-point medium that is a liquid while cooling the boiler circulation water.

Advantageous Effects of Invention

According to an aspect of the present invention, a temperature of an exhaust gas exhausted from an exhaust heat recovery boiler can be regulated.

DESCRIPTION OF EMBODIMENTS

Hereinafter, embodiments of a gas turbine plant according to the present invention will be described with reference to the drawings.

First Embodiment

A first embodiment of the gas turbine plant according to the present invention will be described with reference to FIGS. 1 to 4.

Figure 1:
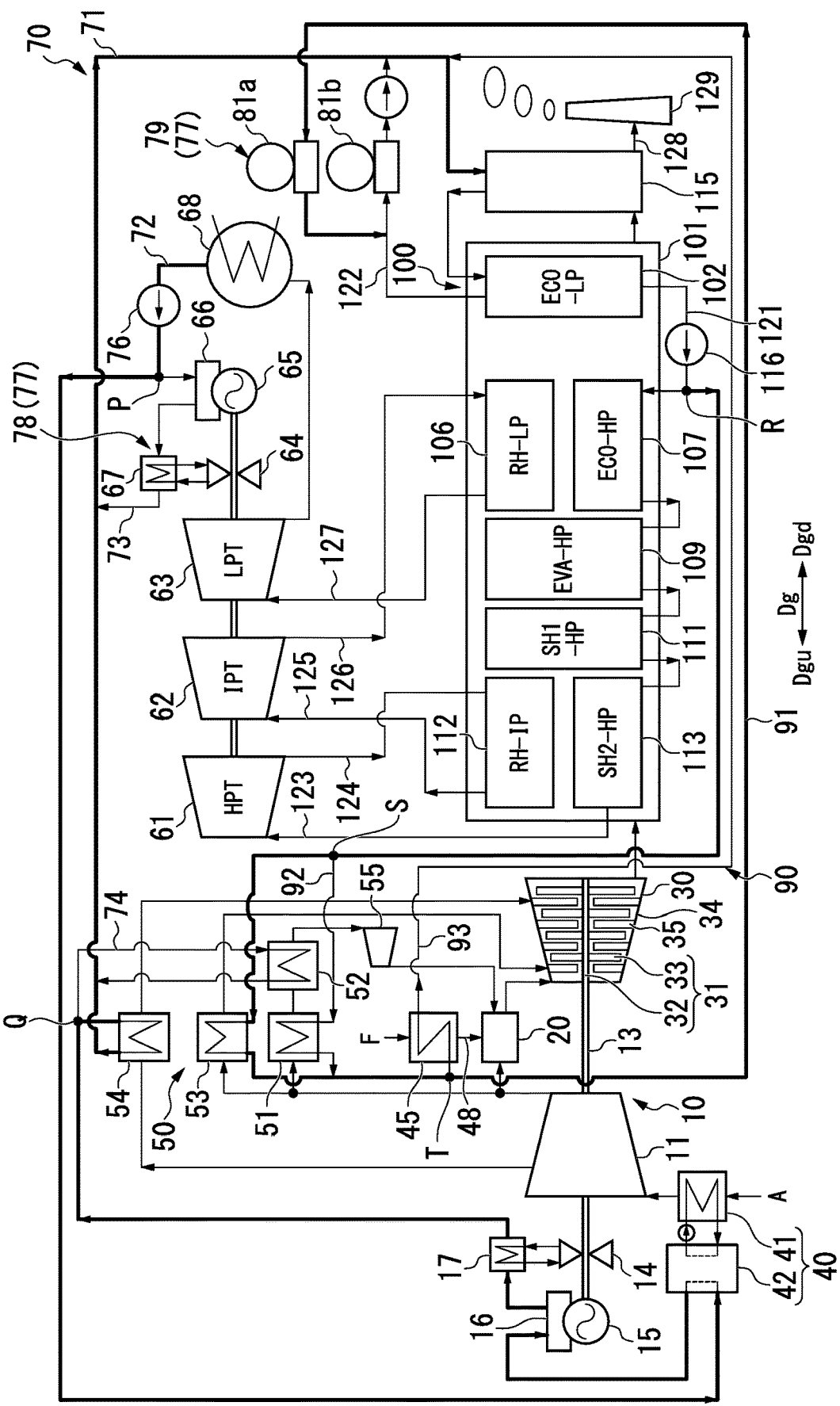
FIG. 1 is a system diagram of a gas turbine plant in a first embodiment according to the present invention.

As shown in FIG. 1, the gas turbine plant of the present embodiment includes a gas turbine 10, a generator 15 that generates electricity by driving the gas turbine 10, an exhaust heat recovery boiler 100, a chimney 129 that discharges exhaust gas from the exhaust heat recovery boiler 100 to the atmosphere, a flue 128 that connects the exhaust heat recovery boiler 100 to the chimney 129, a plurality of steam turbines 61, 62 and 63, a generator 65 that generates electricity by driving the plurality of steam turbines 61, 62 and 63, and a steam condenser 68 that returns steam exhausted from the steam turbines 63 to water. The gas turbine plant further includes an intake air cooler 40, a fuel preheater 45, a cooling air cooler 50, and a water supply system 70 that sends the water in the steam condenser (the water supply source) 68 to the exhaust heat recovery boiler 100. The intake air cooler 40 cools air A which the gas turbine 10 draws in. The fuel preheater 45 preheats fuel F sent to the gas turbine 10. The cooling air cooler 50 cools air for cooling high-temperature components exposed to a high-temperature combustion gas among components constituting the gas turbine 10.

The gas turbine 10 includes an air compressor 11 that compresses the air A, a combustor 20 that burns the fuel F in the air compressed by the air compressor 11 and generates a combustion gas, and a turbine 30 that is driven by a high-temperature high-pressure combustion gas.

The turbine 30 has a rotor 31 that rotates about an axis, a turbine casing 34 that covers the rotor 31, and a plurality of turbine vane rows 35 that are provided on an inner circumferential surface of the turbine casing 34. The plurality of turbine vane rows 35 are arranged at intervals in an axial direction in which the axis extends. Each of the turbine vane rows 35 has a plurality of turbine vanes that are arranged in a circumferential direction centered on the axis. The rotor 31 has a rotor shaft 32 that extends along the axis in the axial direction, and a plurality of turbine blade rows 33 that are fixed to an outer circumference of the rotor shaft 32. Each of the plurality of turbine blade rows 33 are disposed at a downstream side of any one of the turbine vane rows 35 in the axial direction. Each of the turbine blade rows 33 has a plurality of turbine blades that are arranged in the circumferential direction centered on the axis.

Figure 2:
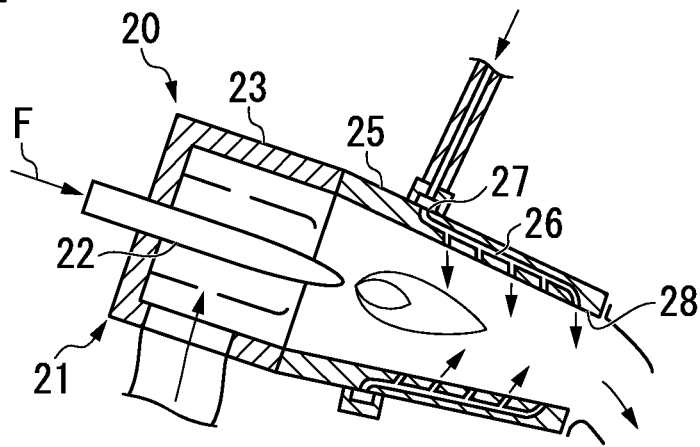
FIG. 2 is a schematic sectional view of a combustor in the first embodiment according to the present invention.

The combustor 20 is fixed to the turbine casing 34. As shown in FIG. 2, the combustor 20 has a transition piece 25 in which the fuel F is burnt and a fuel injector 21 that injects the fuel F into the transition piece 25 along with the compressed air from the air compressor 1. The fuel injector 21 has a burner 22 that injects the fuel F and a burner support tube 23 that supports the burner 22. A cooling air flow passage 26 along which cooling air flows is formed between inner and outer circumferential surfaces of the transition piece 25. The cooling air flow passage 26 has an air inlet 27 that opens to the outer circumferential surface of the transition piece 25, and an air outlet 28 that opens to the inner circumferential surface of the transition piece 25.

As shown in FIG. 1, the turbine rotor 31 and a compressor rotor are disposed on the same axis, and are mutually coupled to form a gas turbine rotor 13. A rotor of the aforementioned generator 15 is connected to the gas turbine rotor 13. The rotor and stator of the generator 15 are cooled by a cooling medium such as hydrogen. For this reason, the generator 15 is provided with a generator cooler 16 that cools the cooling medium by heat exchange with supplied water. The gas turbine rotor 13 and the generator rotor are rotatably supported by a bearing 14. The bearing 14 is provided with a lubricant cooler 17 that allows heat exchange between a lubricant from the bearing 14 and the supplied water, cools the lubricant, and returns the lubricant to the bearing 14.

The intake air cooler 40 has an intake air heat exchanger 41 and an intake air freezer 42. The intake air heat exchanger 41 allows heat exchange between the air A which the air compressor 11 draws in and the cooling medium, and cools the air A while heating the cooling medium. The intake air freezer 42 transfers heat of the cooling medium heated by the intake air heat exchanger 41 to the supplied water, and heats the supplied water while cooling the cooling medium.

The fuel preheater 45 is provided on a fuel line 48 that connects a fuel supply source and the combustor 20. The fuel preheater 45 allows heat exchange between the water heated by the exhaust heat recovery boiler 100 and the fuel F, and heats the fuel F.

The cooling air cooler 50 has a first air cooler 51, a second air cooler 52, a boost compressor 55, a third air cooler 53, and a fourth air cooler 54. Among the components constituting the gas turbine 10, high-temperature components exposed to the high-temperature combustion gas include the transition piece 25 of the combustor 20, the turbine vanes and blades of the turbine 30, and so on. The first air cooler 51 and the second air cooler 52 cool the compressed air compressed by the air compressor 11, and generate transition piece cooling air for cooling the transition piece 25. The boost compressor 55 boosts a pressure of the transition piece cooling air, and sends it to the transition piece 25. The transition piece cooling air sent to the transition piece 25 cools the transition piece 25 through the cooling air flow passage 26 of the transition piece 25. The third air cooler 53 cools the compressed air compressed by the air compressor 11, and generates, for instance, front stage cooling air for cooling the turbine vanes and blades in a front stage of the turbine 30. The fourth air cooler 54 cools air extracted from a middle stage of the air compressor 11, and generates, for instance, rear stage cooling air for cooling the turbine vanes and blades in a rear stage of the turbine 30.

The gas turbine plant of the present embodiment has a low-pressure steam turbine 63, an intermediate-pressure steam turbine 62, and a high-pressure steam turbine 61 as the steam turbines 61, 62 and 63. Rotors of the steam turbines 61, 62 and 63 are disposed on the same axis, and are mutually coupled to form a steam turbine rotor. The rotor of the aforementioned generator 65 is connected to the steam turbine rotor. The rotor and stator of the generator 65 are cooled by a cooling medium such as hydrogen. For this reason, the generator 65 is provided with a generator cooler 66 that cools the cooling medium by heat exchange with the supplied water. The steam turbine rotor and the generator rotor are rotatably supported by a bearing 64, The bearing 64 is provided with a lubricant cooler 67 that allows heat exchange between a lubricant from the bearing 64 and the supplied water, cools the lubricant, and returns the lubricant to the bearing 64. Here, one generator 65 is provided for a total of three stream turbines of the low-pressure steam turbine 63, the intermediate-pressure steam turbine 62, and the high-pressure steam turbine 61, but a generator may be provided on each of the steam turbines 61, 62 and 63.

The steam condenser 68 returns steam exhausted from the low-pressure steam turbine 63 to water.

The water supply system 70 has a water supply line 71 that connects the steam condenser 68 and the exhaust heat recovery boiler 100, a water supply pump 76 that sends the water in the steam condenser 68 to the exhaust heat recovery boiler 100, and a supplied water temperature regulator 77 that regulates a temperature of the supplied water flowing along the water supply line 71. The supplied water temperature regulator 77 has a supplied water heater 78 that heats the supplied water, and a supplied water cooler 79 that cools the supplied water.

The exhaust heat recovery boiler 100 has a boiler outer frame 101, a low-pressure economizer 102, a low-pressure reheater 106, a high-pressure economizer 107, a high-pressure evaporator 109, a first high-pressure superheater 111, an intermediate-pressure reheater 112, a second high-pressure superheater 113, a low-temperature heat exchanger 115, and a high-pressure pump 116.

The boiler outer frame 101 is connected to an exhaust port of the turbine casing 34 and the flue 128. For this reason, the combustion gas that rotates the turbine rotor 31 flows into the boiler outer frame 101 as an exhaust gas. This exhaust gas flows through the boiler outer frame 101, and is discharged to the atmosphere via the flue 128 and the chimney 129. In the present embodiment, the side at which the chimney 129 of the boiler outer frame 101 is located is defined as a downstream side Dgd of a flow of the exhaust gas, and the side opposite thereto is defined as an upstream side Dgu.

At least some of the low-pressure economizer 102, the low-pressure reheater 106, the high-pressure economizer 107, the high-pressure evaporator 109, the first high-pressure superheater 111, the intermediate-pressure reheater 112, and the second high-pressure superheater 113 are provided inside the boiler outer frame 101. Here, the low-pressure economizer 102, the high-pressure economizer 107, the high-pressure evaporator 109, the first high-pressure superheater 111, and the second high-pressure superheater 113 are arranged from the downstream side Dgd of the exhaust gas to the upstream side Dgu thereof in this order. The low-pressure reheater 106 is disposed at the same position as the high-pressure economizer 107 in an upstream/downstream direction Dg of the flow of the exhaust gas. The intermediate-pressure reheater 112 is disposed at the same position as the second high-pressure superheater 113 in the upstream/downstream direction Dg of the flow of the exhaust gas. The low-temperature heat exchanger 115 is disposed inside the flue 128. The low-temperature heat exchanger 115 may be inside the boiler outer frame 101, and be disposed at the downstream side Dgd from the low-pressure economizer 102. The low-temperature heat exchanger 115 may be omitted.

The water supplied from the water supply line 71 flows into the low-temperature heat exchanger 115. The low-temperature heat exchanger 115 allows heat exchange between the exhaust gas flowing through the flue 128 and the supplied water, and heats the supplied water while cooling the exhaust gas. The low-pressure economizer 102 allows heat exchange between the exhaust gas and the supplied water heated by the low-temperature heat exchanger 115, and heats the supplied water to generate low-pressure heated water. The low-pressure economizer 102 and the high-pressure economizer 107 are connected to a first heated waterline 121. The high-pressure pump 116 is provided on the first heated waterline 121. The high-pressure pump 116 boosts a pressure of the low-pressure heated water to generate high-pressure heated water. The high-pressure economizer 107 allows heat exchange between the high-pressure heated water and the exhaust gas, and further heats the high-pressure heated water. The low-pressure reheater 106 allows heat exchange between the steam exhausted from the intermediate-pressure steam turbine 62 and the exhaust gas, superheats this steam, and sends this steam to the low-pressure steam turbine 63 as low-pressure superheated steam.

The high-pressure evaporator 109 allows heat exchange between the high-pressure heated water heated by the high-pressure economizer 107 and the exhaust gas, and heats the high-pressure heated water to generate high-pressure steam. The first high-pressure superheater 111 allows heat exchange between the high-pressure steam and the exhaust gas, and superheats the high-pressure steam. The intermediate-pressure reheater 112 allows heat exchange between the steam exhausted from the high-pressure steam turbine 61 and the exhaust gas, superheats this steam, and sends this steam to the intermediate-pressure steam turbine 62 as intermediate-pressure superheated steam. The second high-pressure superheater 113 allows heat exchange between the high-pressure steam superheated by the first high-pressure superheater 111 and the exhaust gas, further superheats this high-pressure steam, and sends this high-pressure steam to the high-pressure steam turbine 61 as high-pressure superheated steam.

Here, the high-pressure evaporator 109 of the present embodiment is a device that heats water having a temperature, which is lower than or equal to a constant-pressure specific heat maximum temperature Tmax at which constant-pressure specific heat is maximized at a predetermined pressure, to a temperature that is higher than or equal to the constant-pressure specific heat maximum temperature Tmax. To be specific, when a pressure of the water heated by the high-pressure evaporator 109 is a critical pressure, the high-pressure evaporator 109 is a device that heats water having a temperature, which is lower than or equal to a temperature at which constant-pressure specific heat is maximized at a critical pressure, that is, a critical temperature Tmax1 (the constant-pressure specific heat maximum temperature Tmax), to a temperature that is higher than or equal to the critical temperature Tmax1. When the pressure of the water heated by the high-pressure evaporator 109 is higher than the critical pressure, the high-pressure evaporator 109 is a device that heats water having a temperature, which is lower than or equal to a temperature at which constant-pressure specific heat is maximized at the pressure of the water heated by the high-pressure evaporator 109, that is, a pseudocritical temperature Tmax2 (the constant-pressure specific heat maximum temperature Tmax), to a temperature that is higher than or equal to the pseudocritical temperature Tmax2. When the pressure of the water heated by the high-pressure evaporator 109 is lower than the critical pressure, the high-pressure evaporator 109 is a device that heats water having a temperature, which is lower than or equal to a temperature at which constant-pressure specific heat is maximized (in this case, an infinite quantity) at the pressure of the water heated by the high-pressure evaporator 109, that is, a saturation temperature Tmax3 (the constant-pressure specific heat maximum temperature Tmax), to a temperature that is higher than or equal to the saturation temperature Tmax3. Therefore, in the foregoing and following descriptions, the steam generated by the high-pressure evaporator 109 is a fluid when the water having a temperature that is lower than or equal to the critical temperature Tmax1 at the critical pressure reaches a temperature that is higher than or equal to the critical temperature Tmax1, a fluid when the water having a temperature that is lower than or equal to the pseudocritical temperature Tmax2 at the supercritical pressure reaches a temperature that is higher than or equal to the pseudocritical temperature Tmax2, or a fluid when the water having a temperature that is lower than or equal to the saturation temperature Tmax3 at the subcritical pressure reaches a temperature that is higher than or equal to the saturation temperature Tmax3. The high-pressure pump 116 is a pump that boosts a pressure of water to the critical pressure, the supercritical pressure, or the subcritical pressure.

The supplied water cooler 79 has a first low-boiling-point medium Rankine cycle 81a and a second low-boiling-point medium Rankine cycle 81b. In the present embodiment, both the first low-boiling-point medium Rankine cycle 81a and the second low-boiling-point medium Rankine cycle 81b heat absorbing devices that absorb heat from boiler circulation water that is water flowing through the exhaust heat recovery boiler 100.

A Rankine cycle is a cycle that drives a turbine using steam. Meanwhile, a low-boiling-point medium Rankine cycle is a cycle that drives the turbine using a medium having a lower boiling point than water (hereinafter referred to as a low-boiling-point medium).

Figure 3:
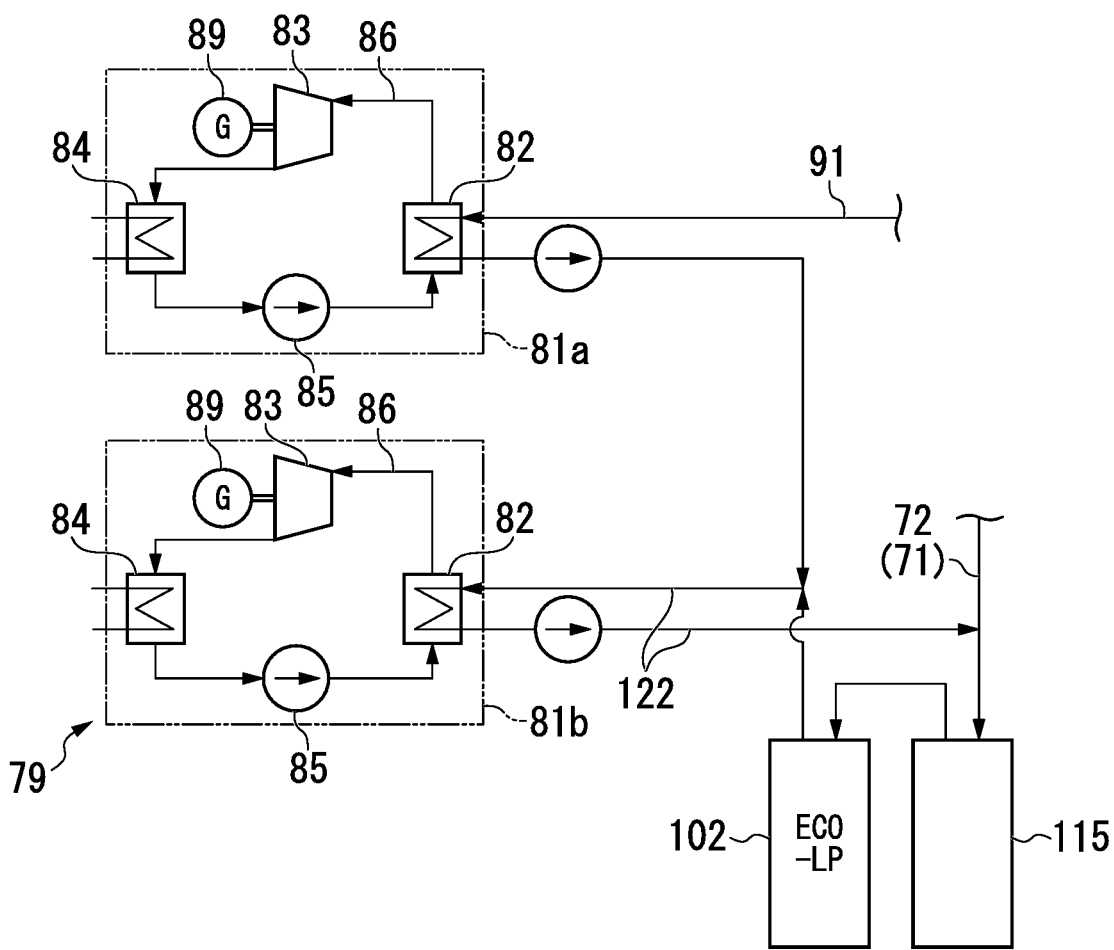
FIG. 3 is a system diagram of a low-boiling-point medium Rankine cycle in the first embodiment according to the present invention.

The low-boiling-point medium may be, for instance, the following materials.
  Organic halogen compounds such as trichloroethylene, tetrachloroethylene, monochlorobenzene, dichlorobenzene, perfluorodecalin, and so on
  Alkanes such as butane, propane, pentane, hexane, heptane, octane, decane, and so on
  Cyclic alkanes such as cyclopentane, cyclohexane, and so on
  Thiophene, ketones, aromatic compounds
  Refrigerants such as R134a, R245fa, and so on
  Combinations thereof As shown in FIG. 3, each of the first low-boiling-point medium Rankine cycle (hereinafter referred to simply as a first Rankine cycle) 81a and the second low-boiling-point medium Rankine cycle (hereinafter referred to simply as a second Rankine cycle) 81b has an evaporator 82 that heats and evaporates a low-boiling-point medium that is a liquid, a turbine 83 that is driven by the evaporated low-boiling-point medium, a steam condenser 84 that cools and condenses the low-boiling-point medium by which the turbine 83 is driven, a low-boiling-point medium pump 85 that returns the condensed low-boiling-point medium to the evaporator 82, and a low-boiling-point medium line 86 that makes the low-boiling-point medium flow between these elements. For example, a generator 89 that generates electricity by driving the turbine 83 may be connected to the turbine 83. The steam condenser 84 is a type of a heat exchanger, and allows heat exchange between the low-boiling-point medium and the cooling medium such as water. The evaporator 82 is also a type of a heat exchanger, and allows heat exchange between the low-boiling-point medium that is the water that is the liquid heated by the exhaust heat recovery boiler 100.

As shown in FIG. 1, the water supply line 71 has a water supply main line 72 that connects the steam condenser 68 and the low-temperature heat exchanger 115 of the exhaust heat recovery boiler 100, and first and second water supply branch lines 73 and 74 that branch off from the water supply main line 72. The water supply main line 72 is provided with a water supply pump 76. The first water supply branch line 73 branches off from a position P located at a downstream side of the flow of the supplied water relative to a position at which the water supply pump 76 is provided on the water supply main line 72. The generator cooler 66 and the lubricant cooler 67 related to the generator 65 connected to the steam turbines are provided on the first water supply branch line 73. Therefore, the generator cooler 66 allows heat exchange between the supplied water flowing along the first water supply branch line 73 and the cooling medium for cooling the generator 65, and cools the cooling medium while heating the supplied water. The lubricant cooler 67 allows heat exchange between the supplied water flowing along the first water supply branch line 73 and the lubricant from the bearing 64, and cools the lubricant while heating the supplied water.

The intake air freezer 42, the generator cooler 16 and the lubricant cooler 17 related to the generator 15 connected to the gas turbine 10, and the fourth air cooler 54 are provided on the water supply main line 72 at a downstream side of the flow of the supplied water relative to the branch position P of the first water supply branch line 73 in this order. Therefore, in the intake air freezer 42, heat of the cooling medium that is heated by heat exchange with the air drawn in by the air compressor 11 is transferred to the supplied water flowing along the water supply main line 72. As a result, the cooling medium is cooled, whereas the supplied water is heated. The generator cooler 16 allows heat exchange between the supplied water flowing along the water supply main line 72 and the cooling medium for cooling the generator 15, and cools the cooling medium while heating the supplied water. The lubricant cooler 17 allows heat exchange between the supplied water flowing along the water supply main line 72 and the lubricant from the bearing 14, and cools the lubricant while heating the supplied water. The fourth air cooler 54 allows heat exchange between the supplied water flowing along the water supply main line 72 and the air extracted from the air compressor 11, and cools the extracted air while heating the supplied water.

The second water supply branch line 74 branches off from a position Q, which is located at a downstream side of the flow of the supplied water relative to a position at which the lubricant cooler 17 is provided and is located at an upstream side of the flow of the supplied water relative to a position at which the fourth air cooler 54 is provided, on the water supply main line 72. The second air cooler 52 is provided on the second water supply branch line 74. The second water supply branch line 74 is connected to the water supply main line 72 at a position located at the downstream side of the flow of the supplied water relative to the branch position Q of the water supply main line 72. Therefore, the second air cooler 52 allows heat exchange between the supplied water flowing along the water supply main line 72 and the compressed air compressed by the air compressor 11, and cools the compressed air while heating the supplied water.

The aforementioned first water supply branch line 73 is connected to the water supply main line 72 at a position located at a downstream side of the flow of the supplied water relative to a connection position between the second water supply branch line 74 and the water supply main line 72.

A second heated water line 122, which returns part of the low-pressure heated water heated by the low-pressure economizer 102 to the water supply line 71, is connected to the low-pressure economizer 102. The second heated water line 122 is connected to the water supply main line 72 at a position located at a downstream side of the flow of the supplied water relative to a connection position between the water supply main line 72 and the first water supply branch line 73.

The second high-pressure superheater 113 and a steam inlet of the high-pressure steam turbine 61 are connected by a high-pressure steam line 123. A steam outlet of the high-pressure steam turbine 61 and the intermediate-pressure reheater 112 are connected by a high-pressure exhaust line 124. The intermediate-pressure reheater 112 and a steam inlet of the intermediate-pressure steam turbine 62 are connected by an intermediate-pressure steam line 125. A steam outlet of the intermediate-pressure steam turbine 62 and the low-pressure reheater 106 are connected by an intermediate-pressure exhaust line 126. The low-pressure reheater 106 and a steam inlet of the low-pressure steam turbine 63 are connected by a low-pressure steam line 127. The steam condenser 68 is connected to a steam outlet of the low-pressure steam turbine 63.

A gas turbine heat capacity regulating line (hereinafter referred to as a GTHC line) 90 branches off from the first heated water line 121 that connects the low-pressure economizer 102 and the high-pressure economizer 107. The GTHC line 90 branches off from a position R located at a downstream side of a flow of the heated water relative to a position at which the high-pressure pump 116 is provided on the first heated water line 121. The GTHC line 90 has a gas turbine heat capacity regulating mainline (hereinafter referred to as a GTHC main line) 91 that connects the first heated water line 121 and the second heated water line 122, a first gas turbine heat capacity regulating branch line (hereinafter referred to as a first GTHC branch line) 92 that branches off from the GTHC main line 91, and a second gas turbine heat capacity regulating branch line (hereinafter referred to as a second GTHC branch line) 93. The first GTHC branch line 92 branches off from the GTHC main line 91, and then is connected to the GTHC main line 91. The first air cooler 51 is provided on the first GTHC branch line 92. Therefore, the first air cooler 51 allows heat exchange between the high-pressure heated water flowing along the first GTHC branch line 92 and the compressed air compressed by the air compressor 11, and cools the compressed air while heating the high-pressure heated water.

The third air cooler 53 is provided between a branch position S of the first GTHC branch line 92 on the GTHC main line 91 and a connection position thereof. Therefore, the third air cooler 53 allows heat exchange between the high-pressure heated water flowing along the GTHC main line 91 and the compressed air compressed by the air compressor 11, and cools the compressed air while heating the high-pressure heated water.

The second GTHC branch line 93 branches off from a position T located at a downstream side of a flow of the high-pressure heated water relative to a connection position between the first GTHC branch line 92 and the GTHC main line 91 on the GTHC main line 91. The second GTHC branch line 93 is connected to the water supply main line 72 at a position located at the downstream side of the flow of the supplied water relative to a connection position between the water supply main line 72 and the second heated water line 122. The fuel preheater 45 is provided on the second GTHC branch line 93. Therefore, the fuel preheater 45 allows heat exchange between the high-pressure heated water flowing along the second GTHC branch line 93 and the fuel F, so that the high-pressure heated water is cooled, whereas the fuel F is heated.

The first Rankine cycle 81$a$ is provided at a position located at a downstream side of the flow of the high-pressure heated water relative to the branch position T of the second GTHC branch line 93 on the GTHC mainline 91. As shown in FIG. 3, the GTHC main line 91 is connected to the evaporator 82 of the first Rankine cycle 81$a$. Therefore, the evaporator 82 allows heat exchange between the low-boiling-point medium flowing through the first Rankine cycle 81$a$ and the high-pressure heated water heated in the process of flowing along the GTHC main line 91, and heats and vaporizes the low-boiling-point medium while cooling the high-pressure heated water.

The second Rankine cycle 81$b$ is provided at a position located at a downstream side of a flow of the low-pressure heated water relative to a junction position with the GTHC main line 91 on the second heated water line 122. The second heated water line 122 is connected to the evaporator 82 of the second Rankine cycle 81$b$. Therefore, the evaporator 82 allows heat exchange between the low-boiling-point medium flowing through the second Rankine cycle 81$b$ and the low-pressure heated water flowing along the second heated water line 122 and between the low-boiling-point medium and the high-pressure heated water cooled by the first Rankine cycle 81$a$, and heats and vaporizes the low-boiling-point medium while cooling the low-pressure heated water and the high-pressure heated water. The temperature of the cooled heated water is lower than a temperature of the cooled water flowing along the water supply main line 72.

Figure 4:
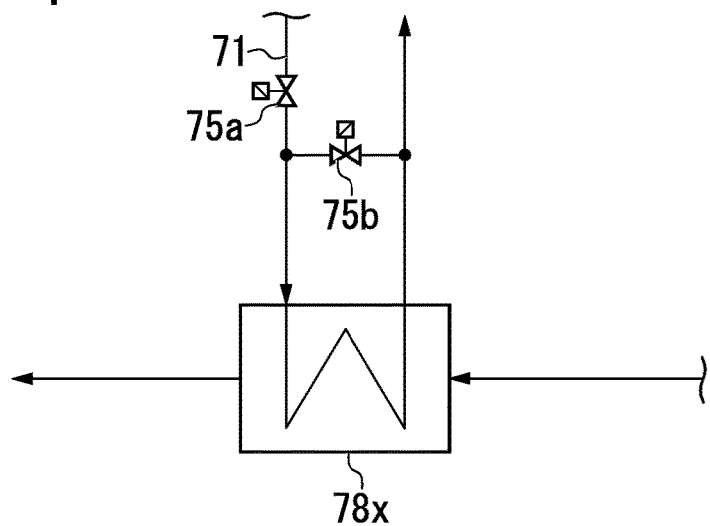
FIG. 4 is a system diagram of a water supply line around machinery in the first embodiment according to the present invention.

As shown in FIG. 1, the supplied water heater 78 is configured to have the generator cooler 66 and the lubricant cooler 67 related to the generator 65, the intake air cooler 40, the generator cooler 16 and the lubricant cooler 17 related to the generator 15, the second air cooler 52, and the fourth air cooler 54, all of which are provided on the water supply line 71. Any of the devices constituting the supplied water heater 78 is a heat transfer device. As shown in FIG. 4, to regulate the flow rate of the supplied water that flows into each device 78$x$ constituting the supplied water heater 78, a flow rate regulating valve 75$a$ or a bypass amount regulating valve 75$b$ is provided on the water supply line 71. The bypass amount regulating valve 75$b$ is provided on a bypass line that allows the supplied water flowing along the water supply line 71 to bypass the device 78$x$.

The first air cooler 51, the third air cooler 53, and the fuel preheater 45, which are provided on the GTHC line 90, constitute a gas turbine heat capacity regulator. Like the water supply line 71 described using FIG. 4, a flow rate regulating valve and a bypass amount regulating valve are provided on the GTHC line 90 in order to regulate the flow rate of the high-pressure heated water that flows into each device constituting the GTHC regulator.

Next, an operation of the gas turbine plant of the present embodiment will be described.

The air compressor 11 of the gas turbine 10 compresses the air A, and supplies the compressed air to the combustor 20. The fuel F is also supplied to the combustor 20. The fuel F is burnt in the compressed air, and a high-temperature high-pressure combustion gas is generated in the combustor 20. This combustion gas is sent from the combustor 20 to a combustion gas flow passage in the turbine 30, and rotates the turbine rotor 31. Due to the rotation of the turbine rotor 31, the generator 15 connected to the gas turbine 10 generates electricity.

The combustion gas that rotates the turbine rotor 31 is exhausted from the gas turbine 10 as an exhaust gas, and is discharged from the chimney 129 to the atmosphere via the exhaust heat recovery boiler 100 and the flue 128. The exhaust heat recovery boiler 100 recovers heat included in the exhaust gas in the process in which the exhaust from the gas turbine 10 flows through the exhaust heat recovery boiler 100.

The supplied water from the water supply line 71 is supplied to the low-temperature heat exchanger 115 of the exhaust heat recovery boiler 100 at a farthest downstream side Dgd (the chimney 129 side). The low-temperature heat exchanger 115 allows heat exchange between the supplied water and the exhaust gas, and heats the supplied water. The supplied water heated by the low-temperature heat exchanger 115 is sent to the low-pressure economizer 102. The low-pressure economizer 102 allows heat exchange between the supplied water and the exhaust gas, and heats the supplied water. Part of the low-pressure heated water that is the supplied water heated by the low-pressure economizer 102 flows into the second heated water line 122. The other part of the low-pressure heated water heated by the low-pressure economizer 102 flows into the first heated waterline 121. The low-pressure heated water flowing into the first heated water line 121 is boosted in pressure by the high-pressure pump 116, and becomes high-pressure heated water. Part of the high-pressure heated water flows into the GTHC line 90. The other part of the high-pressure heated water flows into the high-pressure economizer 107 via the first heated water line 121.

In the high-pressure economizer 107, the high-pressure heated water is further heated by the exhaust gas. The high-pressure heated water heated by the high-pressure economizer 107 is further heated by the high-pressure evaporator 109, and becomes high-pressure steam. This high-pressure steam is further superheated by the first high-pressure superheater 111 and the second high-pressure superheater 113, and becomes high-pressure superheated steam. This high-pressure superheated steam flows into the high-pressure steam turbine 61 via the high-pressure steam line 123, and drives the high-pressure steam turbine 61. In the process in which the high-pressure superheated steam flows through the high-pressure steam turbine 61, a pressure and a temperature thereof are reduced. The high-pressure superheated steam exhausted from the high-pressure steam turbine 61 flows into the intermediate-pressure reheater 112 via the high-pressure exhaust line 124. In the intermediate-pressure reheater 112, the high-pressure superheated steam whose pressure and temperature are reduced is reheated into intermediate-pressure superheated steam. The intermediate-pressure superheated steam flows into the intermediate-pressure steam turbine 62 via the intermediate-pressure steam line 125, and drives the intermediate-pressure steam turbine 62. In the process in which the intermediate-pressure superheated steam flows through the intermediate-pressure steam turbine 62, the pressure and the temperature thereof are reduced. The intermediate-pressure superheated steam exhausted from the intermediate-pressure steam turbine 62 flows into the low-pressure reheater 106 via the intermediate-pressure exhaust line 126. In the low-pressure reheater 106, the intermediate-pressure superheated steam whose pressure and temperature are reduced is reheated into low-pressure superheated steam. The low-pressure superheated steam flows into the low-pressure steam turbine 63, and drives the low-pressure steam turbine 63. The low-pressure superheated steam exhausted from the low-pressure steam turbine 63 flows into the steam condenser 68. In the steam condenser 68, this steam is cooled and condensed into water.

When a temperature of the air A drawn in by the air compressor 11 is increased, a mass flow rate of the air A drawn in by the air compressor 11 is reduced. Therefore, when the temperature of the air A drawn in by the air compressor 11 is increased, a gas turbine output is reduced. Thus, in the present embodiment, heat of the air drawn in by the air compressor 11 is transferred to the supplied water by the intake air cooler 40, and heats the supplied water while cooling the air (an intake air cooling process).

As a temperature of the fuel F supplied to the combustor 20 becomes higher, fuel consumption can be reduced in the combustor 20, and efficiency of the plant is raised. Thus, in the present embodiment, the fuel preheater 45 allows heat exchange between the high-pressure heated water that is the supplied water heated by the low-pressure economizer 102 and the fuel F, and cools the high-pressure heated water while heating the fuel F.

The high-temperature components exposed to the high-temperature high-pressure combustion gas are preferably cooled to improve durability thereof. Thus, in the present embodiment, cooling air is sent to the high-temperature components, and the high-temperature components are cooled by the cooling air. To be specific, in the present embodiment, the first air cooler 51 and the second air cooler 52 cool the compressed air compressed by the air compressor 11, and generate transition piece cooling air (a cooling air cooling process). After the transition piece cooling air is boosted in pressure by the boost compressor 55, it is sent to the transition piece 25 of the combustor 20, and cools the transition piece 25. In the present embodiment, the third air cooler 53 cools the compressed air compressed by the air compressor 11, and generates front stage cooling air (a cooling air cooling process). The front stage cooling air is sent to, for instance, the turbine vanes and blades of the front stage of the turbine 30, and cools them. In the present embodiment, the fourth air cooler 54 cools the air extracted from the middle stage of the air compressor 11, and generates rear stage cooling air (a cooling air cooling process). The rear stage cooling air is sent to, for instance, the turbine vanes and blades of the rear stage of the turbine 30, and cools them.

The supplied water flowing along the water supply line 71 is heated by the supplied water heater 78 in the process of flowing along the water supply line 71 (a supplied water heating process and a heat transferring process). To be specific, the supplied water is heated by the generator cooler 66 and the lubricant cooler 67 related to the generator 65, the intake air cooler 40, the generator cooler 16 and the lubricant cooler 17 related to the generator 15, the second air cooler 52, and the fourth air cooler 54 (a cooling air cooling process, an intake air cooling process, a lubricant cooling process, and a generator cooling process). A heating amount of the supplied water in each of the devices constituting the supplied water heater 78 can be appropriately regulated by changing an opening degree of the flow rate regulating valve 75a or the bypass amount regulating valve 75b provided on each of the devices.

The high-pressure heated water flowing along the GTHC line 90 is heated by the first air cooler 51 and the third air cooler 53. The high-pressure heated water is cooled by the fuel preheater 45. A heating amount of the high-pressure heated water in the first air cooler 51 and the third air cooler 53 can be appropriately regulated by changing an opening degree of the flow rate regulating valve or the bypass valve provided on these air coolers. A cooling amount of the high-pressure heated water in the fuel preheater 45 can be appropriately regulated by changing an opening degree of the flow rate regulating valve or the bypass valve provided on the fuel preheater 45.

As described above, the heated and cooled high-pressure heated water (the heated and cooled boiler circulation water) is cooled by the first Rankine cycle 81a. To be specific, the evaporator 82 of the first Rankine cycle 81a allows heat exchange between the low-boiling-point medium and the high-pressure heated water, and heats and vaporizes the low-boiling-point medium while cooling the high-pressure heated water (a heat absorbing process, a Rankine cycle performing process, and an evaporating process). The vaporized low-boiling-point medium drives the turbine 83 of the first Rankine cycle 81a. As a result, the generator 89 connected to the turbine 83 generates electricity.

The high-pressure heated water cooled by the first Rankine cycle 81a is combined with the low-pressure heated water that flows from the low-pressure economizer 102 along the second heated water line 122. The combined water is cooled by the second Rankine cycle 81b. To be specific, the evaporator 82 of the second Rankine cycle 81b allows heat exchange between the low-boiling-point medium and the combined water (the boiler circulation water), and heats and vaporizes the low-boiling-point medium while cooling the combined water (a heat absorbing process, a Rankine cycle performing process, and an evaporating process). The temperature of the combined water is lower than that of the supplied water at the upstream side of the flow of the supplied water relative to the connection position between the second heated water line 122 and the water supply main line 72 on the water supply main line 72. This water is combined with the supplied water flowing along the water supply main line 72 via the second heated water line 122, and cools this supplied water (a supplied water cooling process).

In the exhaust heat recovery boiler 100, to effectively use the heat of the exhaust gas, the heat of the exhaust gas is preferably used until the temperature of the exhaust gas becomes as low as possible. Meanwhile, if the heat of the exhaust gas becomes too low, NOx and SOx contained in the exhaust gas are condensed into a nitric acid solution and a sulfuric acid solution, and the flue 128 and the chimney 129 are corroded by these corrosive solutions. For this reason, in terms of the effective use of the heat of the exhaust gas and protection of the flue 128 or the like, an adequate temperature is required for the temperature of the exhaust gas exhausted from the exhaust heat recovery boiler 100.

In the exhaust heat recovery boiler 100 of the present embodiment, the low-pressure reheater 106 is disposed at the downstream side Dgd of the high-pressure evaporator 109. Since the seam exhausted from the intermediate-pressure steam turbine 62 flows into the low-pressure reheater 106, it is difficult to regulate the temperature of the exhaust gas in the low-pressure reheater 106. For this reason, it is difficult to regulate the temperature of the exhaust gas even in the low-pressure economizer 102 disposed at the downstream side Dgd from the low-pressure reheater 106.

Thus, in the present embodiment, the supplied water heater 78 that heats the supplied water flowing along the water supply line 71 and the supplied water cooler 79 that cools this supplied water are provided to regulate the temperature of the supplied water flowing into the exhaust heat recovery boiler 100 (a supplied water temperature regulating process, a supplied water heating process, and a supplied water cooling process), and thereby regulate the temperature of the exhaust gas exhausted from the exhaust heat recovery boiler 100. However, in the present embodiment, since the supplied water heater 78 and the supplied water cooler 79 are provided, even when the temperature of the supplied water flowing into the water supply line 71 from the steam condenser 68 is high or low, the temperature of the supplied water flowing into the exhaust heat recovery boiler 100 can be regulated to a target temperature.

As described above, in the present embodiment, since the temperature of the exhaust gas exhausted from the exhaust heat recovery boiler 100 can be regulated, the heat of the exhaust gas can be effectively used, and simultaneously the corrosion of the flue 128 or the like caused by NOx and SOx contained in the exhaust gas can be inhibited.

In the present embodiment, the heat from the cooling target of the gas turbine 10 is used as a heat source that heats the supplied water using the supplied water heater 78. For this reason, in the present embodiment, the heat from this cooling target can be effectively used. In the present embodiment, the supplied water cooler 79 cools the heated water used to cool the supplied water. In the present embodiment, the turbines 83 of the Rankine cycles 81a and 81b are driven by heat obtained by cooling the heated water, and power is obtained. For this reason, in the present embodiment, the heat from the heated water can also be effectively used.

The only evaporator of the exhaust heat recovery boiler 100 of the present embodiment is the high-pressure evaporator 109 alone. That is, in the exhaust heat recovery boiler 100 of the present embodiment, the entire amount of the steam generated by this boiler is generated by the high-pressure evaporator 109. Since the steam generated by the high-pressure evaporator 109 has a high temperature and a high pressure, it can be used to drive the high-pressure steam turbine 61, the intermediate-pressure steam turbine 62, and the low-pressure steam turbine 63. That is, the steam generated by the high-pressure evaporator 109 is steam having a high value in use. For this reason, the steam generated by the exhaust heat recovery boiler 100 can be effectively used. However, since the evaporator of the exhaust heat recovery boiler 100 of the present embodiment is the high-pressure evaporator 109 alone, the number of heat exchangers constituting the exhaust heat recovery boiler 100 can be reduced, and facility costs and maintenance costs can be reduced.

The plant of the present embodiment has the GTHC line 90. Thereby, even when the evaporator is the high-pressure evaporator 109 alone, and even in the case of low heat recovery or few options to select the heat source, the exhaust heat of the cooling air cooler is effectively recovered and is put to good use, and the fuel F is heated by the fuel preheater 45, so that efficiency of the plant can be improved.

<Modification of the Heat Absorbing Device>

Figure 5:
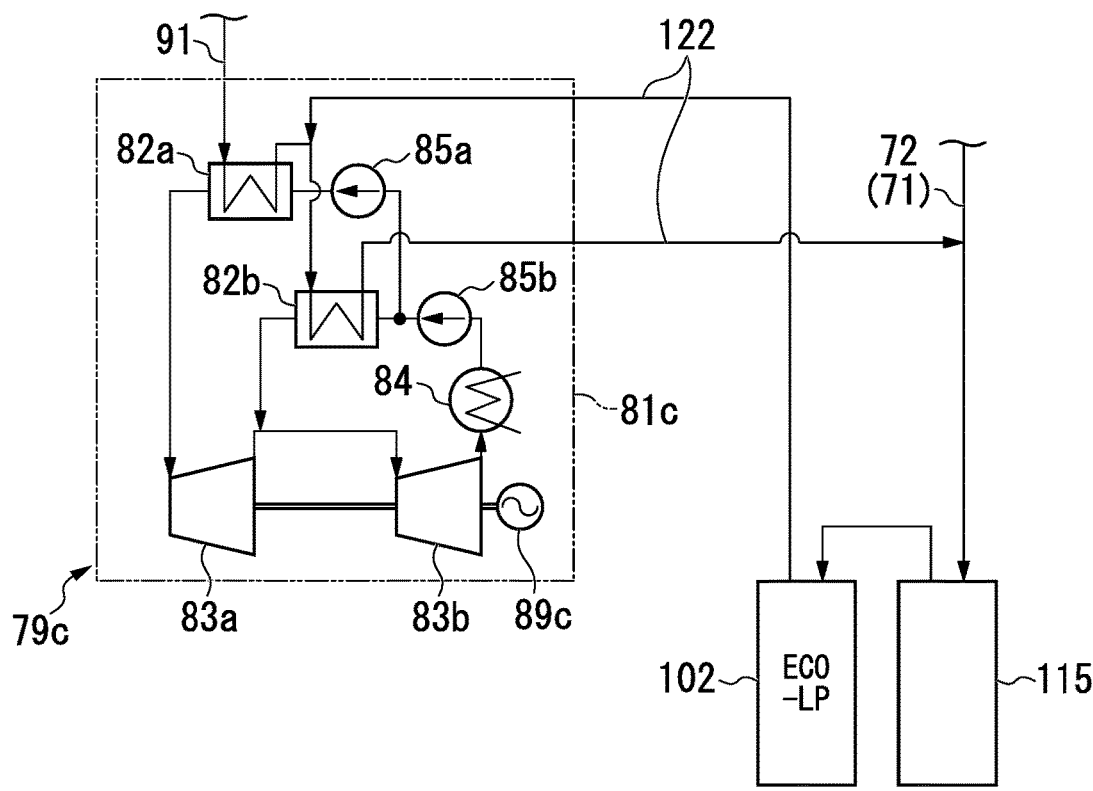
FIG. 5 is a system diagram of a low-boiling-point medium Rankine cycle in a modification of the first embodiment according to the present invention.

A modification of the heat absorbing device in the first embodiment will be described with reference to FIG. 5.

The heat absorbing device of the first embodiment has the two Rankine cycles 81a and 81b. However, the functions of the two Rankine cycles 81a and 81b in the first embodiment can also be met by one Rankine cycle.

The heat absorbing device of this modification has a Rankine cycle 81c. The heat absorbing device also constitutes a supplied water cooler 79c. The Rankine cycle 81c has a first evaporator 82a, a second evaporator 82b, a first turbine 83a, a second turbine 83b, a steam condenser 84, a first low-boiling-point medium pump 85a, and a second low-boiling-point medium pump 85b. The first evaporator 82a allows heat exchange between high-pressure heated water flowing along a GTHC main line 91 and a low-boiling-point medium that is a liquid, and cools the high-pressure heated water while heating and evaporating the low-boiling-point medium. The second evaporator 82b allows heat exchange between water into which low-pressure heated water from a low-pressure economizer 102 and high-pressure heated water flowing out of the first evaporator 82a are combined and the low-boiling-point medium that is a liquid, and cools the combined water while heating and evaporating the low-boiling-point medium. The first turbine 83a is driven by the low-boiling-point medium evaporated by the first evaporator 82a. The second turbine 83b is driven by the low-boiling-point medium exhausted from the first turbine 83a and the low-boiling-point medium evaporated by the second evaporator 82b. A rotor of the first turbine 83a and a rotor of the second turbine 83b are connected to each other. The generator 89c that generates electricity, for instance, by driving the first turbine 83a and the second turbine 83b is connected to the rotors. The steam condenser 84 condenses the low-boiling-point medium exhausted from the second turbine 83b. The first low-boiling-point medium pump 85a sends the condensed low-boiling-point medium to the first evaporator 82a. The second low-boiling-point medium pump 85b sends the condensed low-boiling-point medium to the first low-boiling-point medium pump 85a and the second evaporator 82b.

The heat absorbing device may be only one of the first Rankine cycle 81a and the second Rankine cycle 81b. For example, the first Rankine cycle 81a maybe omitted, and only the second Rankine cycle 81b maybe used. Alternatively, the second Rankine cycle 81b may be omitted, and only the first Rankine cycle 81a may be used. In this case, the GTHC main line 91 is connected to a water supply main line 72. Even in the case described above, the temperature of the water flowing through the Rankine cycle needs to be lower than that of the supplied water at the upstream side of the flow of the supplied water relative to a position at which the water is combined with the supplied water on the water supply main line 72. For this reason, in some cases, the amount of heat exchange between the low-boiling-point medium in the Rankine cycle and the water needs to be more than that of the heat exchange between the low-boiling-point medium in the Rankine cycle and the water in the embodiment. In this case, the discharge flow rate of the low-boiling-point medium from the low-boiling-point medium pump of this Rankine cycle is increased, but the heat transfer area in the evaporator of the Rankine cycle is increased.

Any of the heat absorbing device of the first embodiment, the heat absorbing device of this modification, and the heat absorbing device of each of the following embodiments constitutes a supplied water cooler that cools the supplied water. However, each of these heat absorbing devices may constitute a supplied water heater. The heat absorbing device functioning as the supplied water heater also absorbs the heat from the boiler circulation water that is the water flowing through an exhaust heat recovery boiler 100, and reduces the temperature of this boiler circulation water. However, the temperature of the boiler circulation water from the heat absorbing device functioning as the supplied water heater is higher than that of the supplied water at the upstream side of the flow of the supplied water relative to a position at which the boiler circulation water is combined with the supplied water on the water supply main line 72. Therefore, the heat absorbing device may function as either a supplied water cooler or a supplied water heater.

Any of the heat absorbing devices described above is a low-boiling-point medium Rankine cycle. However, in place of a low-boiling-point medium Rankine cycle, a heat transfer device may be provided as a heat absorbing device. In this case, the heat of the boiler cooling water is transferred to another medium by this heat transfer device, so that a temperature of the boiler cooling water is reduced, and simultaneously a temperature of the medium is increased. The heat of the medium whose temperature is increased may be used, for instance, in a heat source of a factory process, a heat source of a chemical reaction, generation of steam, hot-water supply, air conditioning, and so on.

Second Embodiment

Figure 6:
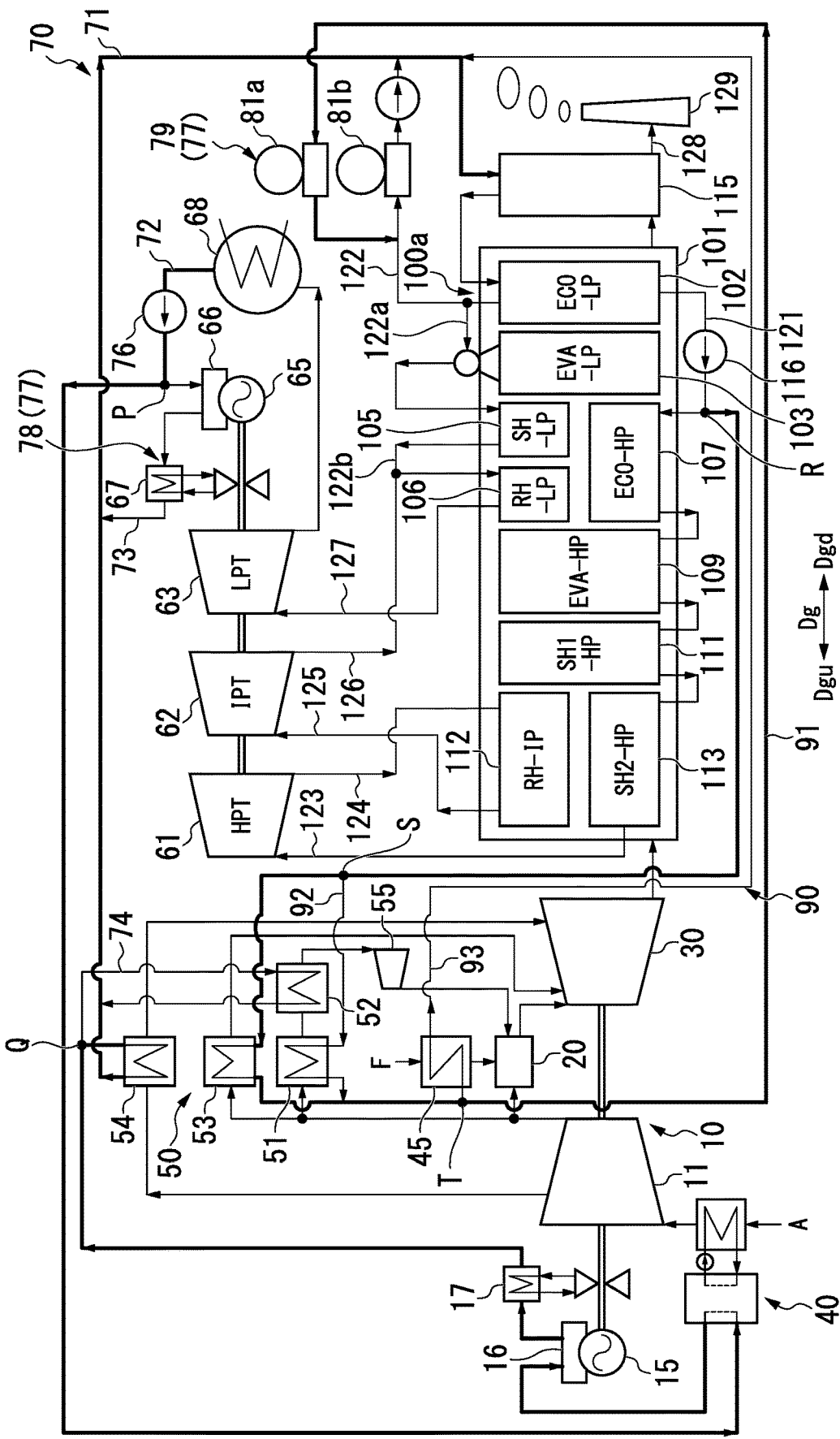
FIG. 6 is a system diagram of a gas turbine plant in a second embodiment according to the present invention.

A second embodiment of the gas turbine plant according to the present invention will be described with reference to FIG. 6.

Since the gas turbine plant of the present embodiment is to change the exhaust heat recovery boiler 100 in the gas turbine plant of the first embodiment, the other components are the same as in the gas turbine plant of the first embodiment.

An exhaust heat recovery boiler 100a of the present embodiment has a low-pressure evaporator 103 and a low-pressure superheater 105 in addition to the components of the exhaust heat recovery boiler 100 of the first embodiment.

The low-pressure evaporator 103 is disposed between a low-pressure economizer 102 and a high-pressure economizer 107 in an upstream/downstream direction Dg of a combustion gas. The low-pressure superheater 105 is disposed at a position of the high-pressure economizer 107 in the upstream/downstream direction Dg of the combustion gas. In the present embodiment, a low-pressure reheater 106 is also disposed at the position of the high-pressure economizer 107 in the upstream/downstream direction Dg of the combustion gas in addition to the low-pressure superheater 105. However, the low-pressure superheater 105 is disposed at a downstream side Dgd from the low-pressure reheater 106 in the upstream/downstream direction Dg of the combustion gas.

A second heated water line 122 connected to a low-pressure economizer 102 branches off on the way. This branching line forms a heated water supply line 122a, and is connected to the low-pressure evaporator 103. In the low-pressure evaporator 103, low-pressure heated water that is supplied water heated by the low-pressure economizer 102 becomes low-pressure steam heated by an exhaust gas. This low-pressure steam is superheated by the low-pressure superheater 105, and becomes low-pressure superheated steam. A low-pressure superheated steam line 122b is connected to the low-pressure superheater 105. The low-pressure superheated steam line 122b is connected to an intermediate-pressure exhaust line 126 that connects a steam outlet of an intermediate-pressure steam turbine 62 and the low-pressure reheater 106. Therefore, the low-pressure superheated steam from the low-pressure superheater 105 flows into the low-pressure reheater 106 via the low-pressure superheated steam line 122b and the intermediate-pressure exhaust line 126. As in the first embodiment, the steam flowing into the low-pressure reheater 106 is superheated by the low-pressure reheater 106, and then is sent to a low-pressure steam turbine 63.

Like the gas turbine plant of the first embodiment, the gas turbine plant of the present embodiment is configured such that, since the low-pressure reheater 106 is disposed at a downstream side Dgd of a high-pressure evaporator 109, but a supplied water heater 78 and a supplied water cooler 79 are provided, even when the flow rate of the low-pressure steam is small, the temperature of the supplied water flowing into the exhaust heat recovery boiler 100a can be regulated to a target temperature. Therefore, in the present embodiment, since the temperature of the exhaust gas exhausted from the exhaust heat recovery boiler 100a can be regulated, heat of the exhaust gas can be effectively used, and corrosion of a flue 128 or the like caused by condensation of NOx and SOx contained in the exhaust gas can be suppressed.

The plant of the present embodiment has a GTHC line 90. Thereby, even when a flow rate of the low-pressure steam is small, and even in the case of low heat recovery or few options to select the heat source, exhaust heat of a cooling air cooler is effectively recovered and is put to good use, and fuel F is heated by a fuel preheater 45, so that the efficiency of the plant can be improved.

Third Embodiment

Figure 7:
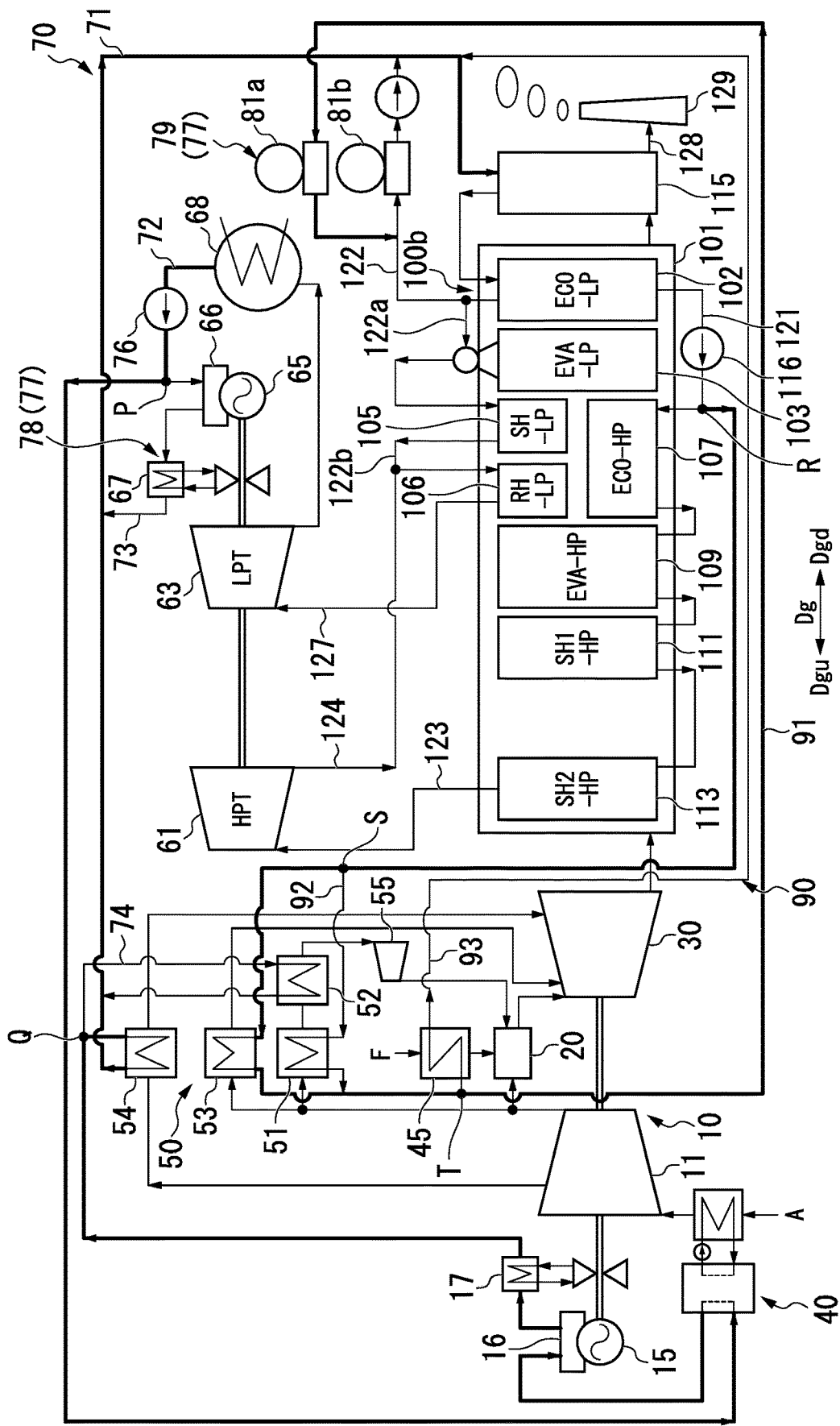
FIG. 7 is a system diagram of a gas turbine plant in a third embodiment according to the present invention.

A third embodiment of the gas turbine plant according to the present invention will be described with reference to FIG. 7.

The gas turbine plant of the present embodiment has a high-pressure steam turbine 61 and a low-pressure steam turbine 63, but not the intermediate-pressure steam turbine 62 in the gas turbine plants of the first and second embodiments. In this connection, an exhaust heat recovery boiler 100b in the gas turbine plant of the present embodiment is different from the exhaust heat recovery boilers 100 and 100a of the first and second embodiments.

The exhaust heat recovery boiler 100b of the present embodiment is a boiler in which the intermediate-pressure reheater 112 is omitted from the exhaust heat recovery boiler 100a of the second embodiment. In other words, the exhaust heat recovery boiler 100b of the present embodiment is a boiler in which a low-pressure evaporator 103 and a low-pressure superheater 105 are added to the exhaust heat recovery boiler 100 of the first embodiment, whereas the intermediate-pressure reheater 112 is omitted from the exhaust heat recovery boiler 100 of the first embodiment.

Since the gas turbine plant of the present embodiment does not have the intermediate-pressure steam turbine 62 and the intermediate-pressure reheater 112 in the gas turbine plants of the first and second embodiments, the gas turbine plant of the present embodiment does not have an intermediate-pressure steam line 125 that connects the intermediate-pressure reheater 112 and a steam inlet of the intermediate-pressure steam turbine 62, and the intermediate-pressure exhaust line 126 that connects a steam outlet of the intermediate-pressure steam turbine 62 and a low-pressure reheater 106.

A high-pressure exhaust line 124 connected to a steam outlet of the high-pressure steam turbine 61 of the present embodiment is connected to the low-pressure reheater 106. A low-pressure superheated steam line 122b connected to the low-pressure superheater 105 is connected to the high-pressure exhaust line 124. In the present embodiment, low-pressure superheated steam of the low-pressure superheater 105 and high-pressure steam exhausted from the high-pressure steam turbine 61 flow into the low-pressure reheater 106. As in the first embodiment, the steam flowing into the low-pressure reheater 106 is superheated by the low-pressure reheater 106, and then is sent to the low-pressure steam turbine 63.

Like the exhaust heat recovery boilers 100 and 100a of the first and second embodiments, the exhaust heat recovery boiler 100b of the present embodiment is configured such that the low-pressure reheater 106 is disposed at a downstream side Dgd of a high-pressure evaporator 109, but the intermediate-pressure reheater 112 is not disposed at an upstream side Dgu of the high-pressure evaporator 109. However, as in each of the aforementioned embodiments, since the gas turbine plant of the present embodiment also includes a supplied water heater 78 and a supplied water cooler 79, a temperature of the supplied water flowing into the exhaust heat recovery boiler 100b can be regulated to a target temperature. Therefore, in the present embodiment, since a temperature of the exhaust gas exhausted from the exhaust heat recovery boiler 100b can be regulated, heat of the exhaust gas can be effectively used, and corrosion of a flue 128 or the like caused by condensation of NOx and SOx contained in the exhaust gas can be suppressed.

The plant of the present embodiment has a GTHC line 90. Thereby, even when a flow rate of the low-pressure steam is small, and even in the case of low heat recovery or few options to select the heat source, exhaust heat of a cooling air cooler is effectively recovered and is put to good use, and fuel F is heated by a fuel preheater 45, so that the efficiency of the plant can be improved.

Fourth Embodiment

Figure 8:
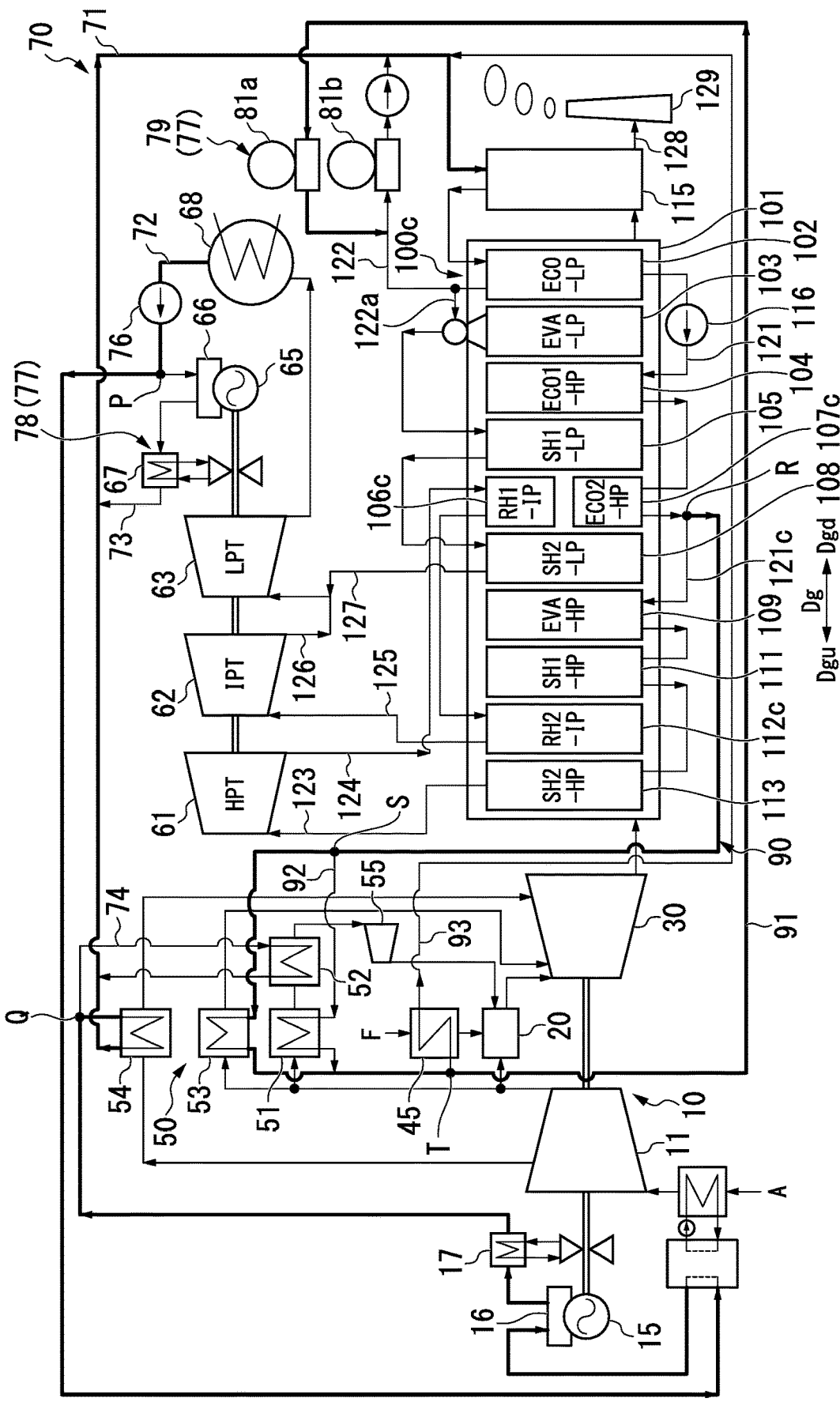
FIG. 8 is a system diagram of a gas turbine plant in a fourth embodiment according to the present invention.

A fourth embodiment of the gas turbine plant according to the present invention will be described with reference to FIG. 8.

Since the gas turbine plant of the present embodiment is to change the exhaust heat recovery boiler 100 in the gas turbine plant of the first embodiment, the other components are basically the same as in the gas turbine plant of the first embodiment.

An exhaust heat recovery boiler 100c of the present embodiment has a low-temperature heat exchanger 115, a low-pressure economizer 102, a low-pressure evaporator 103, a first high-pressure economizer 104, a first low-pressure superheater 105, a first intermediate-pressure reheater 106c, a second high-pressure economizer 107c, a second low-pressure superheater 108, a high-pressure evaporator 109, a first high-pressure superheater 111, a second intermediate-pressure reheater 112c, and a second high-pressure superheater 113. The low-temperature heat exchanger 115, the low-pressure economizer 102, the low-pressure evaporator 103, the first high-pressure economizer 104, the first low-pressure superheater 105, the first intermediate-pressure reheater 106c, the second low-pressure superheater 108, the high-pressure evaporator 109, the first high-pressure superheater 111, the second intermediate-pressure reheater 112c, and the second high-pressure superheater 113 are arranged from a downstream side Dgd of an exhaust gas to an upstream side Dgu thereof in this order. Therefore, in the exhaust heat recovery boiler 100c of the present embodiment, the first intermediate-pressure reheater 106c is disposed at a downstream side Dgd of the high-pressure evaporator 109, and the second intermediate-pressure reheater 112c is disposed at an upstream side Dgu of the high-pressure evaporator 109. The second high-pressure economizer 107c is disposed at a position of the first intermediate-pressure reheater 106c in an upstream/downstream direction Dg of the exhaust gas. The second high-pressure economizer 107c and the high-pressure evaporator 109 are connected by a high-temperature heated waterline 121c. A GTHC line 90 branches off from the high-temperature heated water line 121c.

A steam outlet of a high-pressure steam turbine 61 and the first intermediate-pressure reheater 106c are connected by a high-pressure exhaust line 124. The second intermediate-pressure reheater 112c and a steam inlet of an intermediate-pressure steam turbine 62 are connected by an intermediate-pressure steam line 125. The second low-pressure superheater 108 and a steam inlet of a low-pressure steam turbine 63 are connected by a low-pressure steam line 127. A steam outlet of the intermediate-pressure steam turbine 62 and the low-pressure steam line 127 are connected by an intermediate-pressure exhaust line 126.

As in each of the aforementioned embodiments, supplied water from a water supply line 71 is supplied to the low-temperature heat exchanger 115 at a farthest downstream side Dgd in the exhaust heat recovery boiler 100c. The low-temperature heat exchanger 115 heats the supplied water. The low-pressure economizer 102 further heats the supplied water heated by the low-temperature heat exchanger 115. Part of low-pressure heated water that is the supplied water heated by the low-pressure economizer 102 flows into a second heated water line 122. The other part of the low-pressure heated water heated by the low-pressure economizer 102 flows into a first heated waterline 121. The low-pressure heated water flowing into the first heated water line 121 is boosted in pressure by a high-pressure pump 116, and becomes high-pressure heated water. The high-pressure heated water is further heated by the first high-pressure economizer 104 and the second high-pressure economizer 107c, and becomes high-temperature heated water. Part of the high-temperature heated water flows into the GTHC line 90, and is used to cool air from an air compressor 11 as in each of the aforementioned embodiments. The other part of the high-temperature heated water is heated by the high-pressure evaporator 109, and becomes high-pressure steam. The high-pressure steam is superheated by the first high-pressure superheater 111 and the second high-pressure superheater 113, and becomes high-pressure superheated steam. The high-pressure superheated steam is sent to a high-pressure steam turbine 61 via a high-pressure steam line 123, and drives the high-pressure steam turbine 61. The high-pressure superheated steam exhausted from the high-pressure steam turbine 61 is sent to the first intermediate-pressure reheater 106c via the high-pressure exhaust line 124. The high-pressure superheated steam is superheated by the first intermediate-pressure reheater 106c and the second intermediate-pressure reheater 112c, and becomes intermediate-pressure superheated steam. The intermediate-pressure superheated steam is sent to the intermediate-pressure steam turbine 62 via the intermediate-pressure steam line 125, and drives the intermediate-pressure steam turbine 62. The intermediate-pressure superheated steam exhausted from the intermediate-pressure steam turbine 62 is sent to the low-pressure steam turbine 63 via the intermediate-pressure exhaust line 126 and the low-pressure steam line 127.

Part of the low-pressure heated water that is the supplied water heated by the low-pressure economizer 102 is heated by the low-pressure evaporator 103, and becomes low-pressure steam. The low-pressure steam is superheated by the first low-pressure superheater 105 and the second low-pressure superheater 108, and becomes low-pressure superheated steam. The low-pressure superheated steam is sent to the low-pressure steam turbine 63 via the low-pressure steam line 127. Therefore, in the present embodiment, the low-pressure superheated steam and the intermediate-pressure superheated steam exhausted from the intermediate-pressure steam turbine 62 flow into the low-pressure steam turbine 63. As in each of the aforementioned embodiments, the low-pressure superheated steam exhausted from the low-pressure steam turbine 63 flows into a steam condenser 68.

As described above, in the exhaust heat recovery boiler 100c of the present embodiment, the first intermediate-pressure reheater 106c is disposed at the downstream side Dgd of the high-pressure evaporator 109, and the second intermediate-pressure reheater 112c is disposed at the upstream side Dgu of the high-pressure evaporator 109. Furthermore, the exhaust heat recovery boiler 100c of the present embodiment has the low-pressure evaporator 103 and the low-pressure economizer 102 that are not provided on the exhaust heat recovery boiler 100 of the first embodiment. However, as in each of the aforementioned embodiments, the gas turbine plant of the present embodiment includes a supplied water heater 78 and a supplied water cooler 79, and thus a temperature of the supplied water flowing into the exhaust heat recovery boiler 100c can be regulated to a target temperature. Therefore, in the present embodiment, since a temperature of the exhaust gas exhausted from the exhaust heat recovery boiler 100c can be regulated, heat of the exhaust gas can be effectively used, and corrosion of a flue 128 or the like caused by condensation of NOx and SOx contained in the exhaust gas can be suppressed.

The plant of the present embodiment has the GTHC line 90. Thereby, even when a flow rate of the low-pressure steam is small, and even in the case of low heat recovery or few options to select the heat source, exhaust heat of a cooling air cooler is effectively recovered and is put to good use, and fuel F is heated by a fuel preheater 45, so that efficiency of the plant can be improved.

Fifth Embodiment

Figure 9:
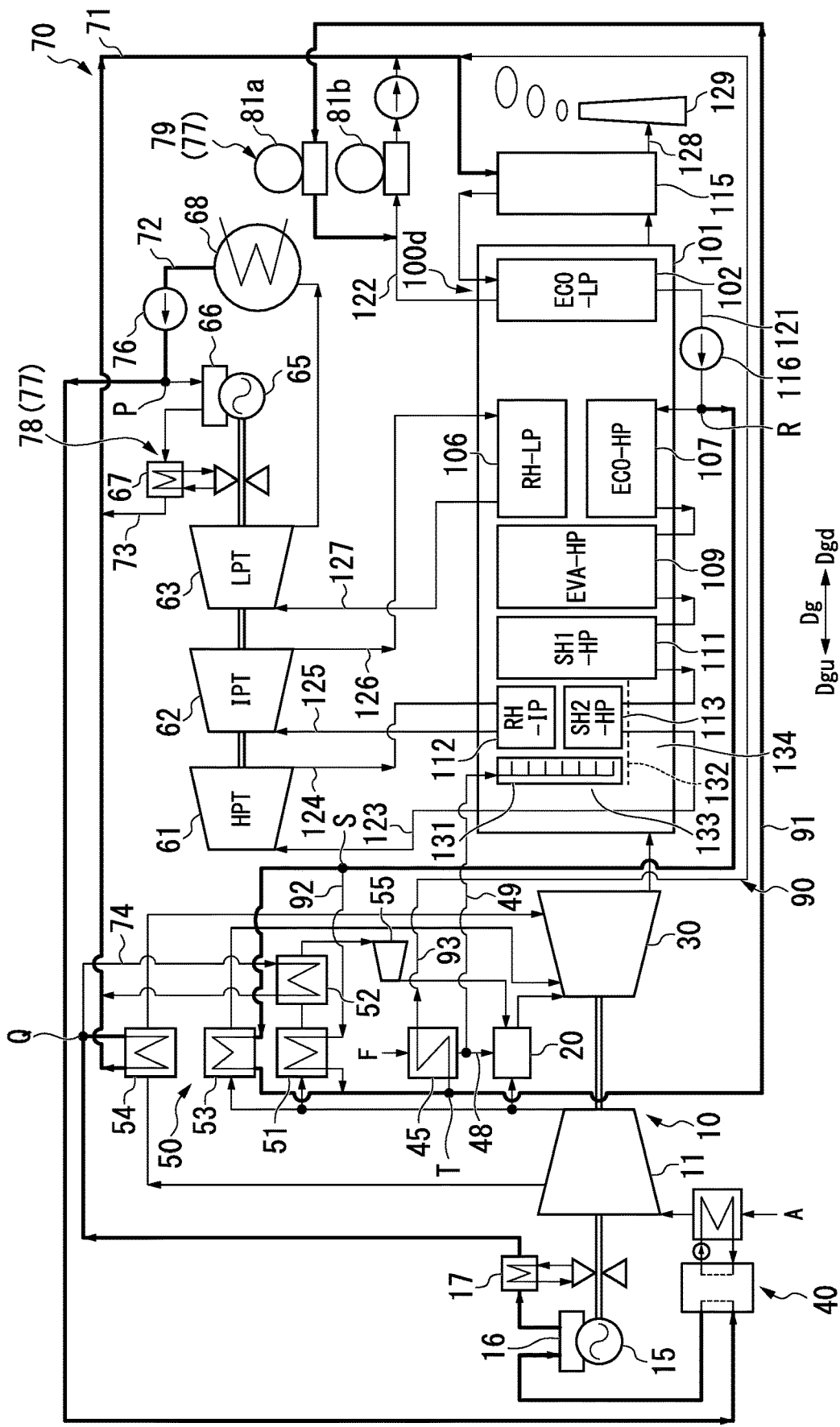
FIG. 9 is a system diagram of a gas turbine plant in a fifth embodiment according to the present invention.

A fifth embodiment of the gas turbine plant according to the present invention will be described with reference to FIG. 9.

Since the gas turbine plant of the present embodiment is to change the exhaust heat recovery boiler 100 in the gas turbine plant of the first embodiment, the other components are the same as in the gas turbine plant of the first embodiment.

An exhaust heat recovery boiler 100d of the present embodiment has an auxiliary combustor 131 in addition to the components of the exhaust heat recovery boiler 100 of the first embodiment.

A flow passage branch plate 132 is disposed in a boiler outer frame 101 of the exhaust heat recovery boiler 100d of the present embodiment. The flow passage branch plate 132 branches off a portion located at an upstream side Dgu from a first high-pressure superheater 111 within an exhaust gas flow passage in the boiler outer frame 101 into a first flow passage 133 and a second flow passage 134. The auxiliary combustor 131, an intermediate-pressure reheater 112, and a second high-pressure superheater 113 are disposed within the first flow passage 133. The position of the intermediate-pressure reheater 112 in an upstream/downstream direction Dg and the position of the second high-pressure superheater 113 in the upstream/downstream direction Dg are the same within the first flow passage 133.

The auxiliary combustor 131 is disposed at an upstream side Dgu from the intermediate-pressure reheater 112 and the second high-pressure superheater 113 within the first flow passage 133. Meanwhile, no heat exchangers for exchanging heat between an exhaust gas and water are disposed within the second flow passage 134.

Fuel F heated by a fuel preheater 45 is supplied to the auxiliary combustor 131 by an auxiliary fuel line 49. The auxiliary combustor 131 burns the fuel F in the first flow passage 133. For this reason, part of the exhaust gas exhausted from the gas turbine 10 reaches a high-temperature, and becomes a reheated exhaust gas. Both the steam flowing into the intermediate-pressure reheater 112 and the steam flowing into the second high-pressure superheater 113 are heated by a high-temperature reheated exhaust gas.

A reheated exhaust gas flowing through the intermediate-pressure reheater 112 and the second high-pressure superheater 113 heats heated water flowing through the first high-pressure superheater 111. The other part of the exhaust gas exhausted from the gas turbine 10 flows along the second flow passage 134. This exhaust gas also heats the heated water flowing through the first high-pressure superheater 111. That is, in the first high-pressure superheater 111, the reheated exhaust gas and the heated water are subjected to heat exchange, and simultaneously the exhaust gas and the heated water are subjected to heat exchange.

As in the present embodiment, the auxiliary combustor 131 is provided in the boiler outer frame 101, and thereby high-temperature high-pressure superheated steam and high-temperature intermediate-pressure superheated steam can be obtained by supply of a slight amount of fuel to the auxiliary combustor 131, compared to in each of the aforementioned embodiments. That is, in the present embodiment, a value in use of the steam can be increased.

Like the gas turbine plant of the first embodiment, the gas turbine plant of the present embodiment is configured such that, since the low-pressure reheater 106 is disposed at a downstream side Dgd of a high-pressure evaporator 109, but a supplied water heater 78 and a supplied water cooler 79 are provided, the temperature of the supplied water flowing into the exhaust heat recovery boiler 100d can be regulated to a target temperature.

Sixth Embodiment

Figure 10:
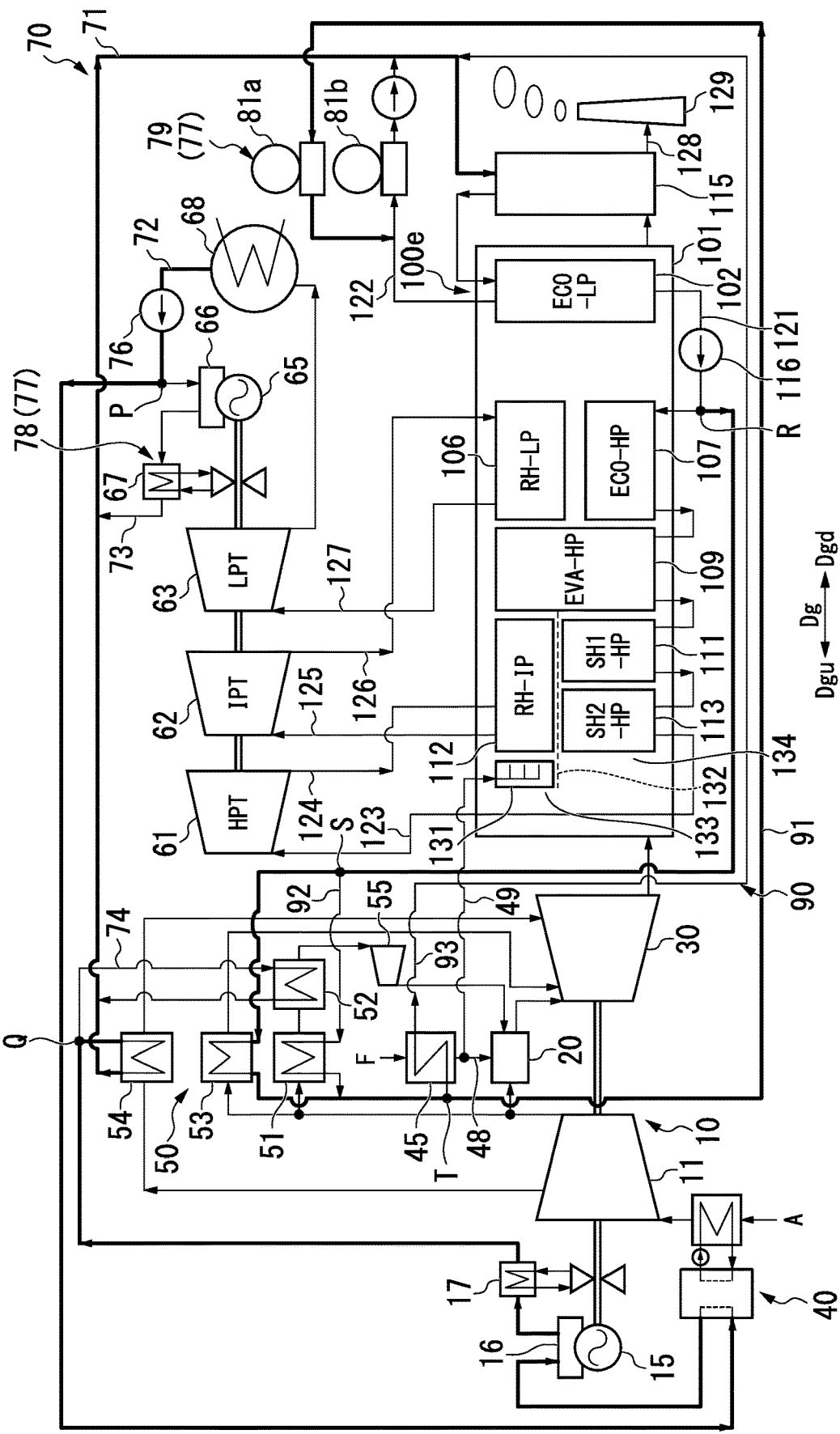
FIG. 10 is a system diagram of a gas turbine plant in a sixth embodiment according to the present invention.

A sixth embodiment of the gas turbine plant according to the present invention will be described with reference to FIG. 10.

Since the gas turbine plant of the present embodiment is to change positions of an intermediate-pressure reheater 112, a second high-pressure superheater 113, and a first high-pressure superheater 111 relative to the auxiliary combustor 131 in the fifth embodiment, the other components are the same as in the fifth embodiment.

An auxiliary combustor 131 and the intermediate-pressure reheater 112 are disposed within a first flow passage 133 in a boiler outer frame 101. The second high-pressure superheater 113 and the first high-pressure superheater 111 are disposed within a second flow passage 134 in the boiler outer frame 101. That is, in the present embodiment, unlike the fifth embodiment, the second high-pressure superheater 113 is not disposed within the first flow passage 133. The second high-pressure superheater 113 is disposed within the second flow passage 134. The first high-pressure superheater 111 is disposed at a downstream side Dgd of the second high-pressure superheater 113 within the second flow passage 134.

In the present embodiment, like the fifth embodiment, the auxiliary combustor 131 is provided in the boiler outer frame 101, and thereby high-temperature intermediate-pressure superheated steam can be obtained by supply of slight fuel to the auxiliary combustor 131, compared to in each of the aforementioned embodiments. In the present embodiment, since the second high-pressure superheater 113 through which high-pressure heated water flows is not exposed to a high-temperature reheated exhaust gas, durability of the second high-pressure superheater 113 can be improved compared to the fifth embodiment. In other words, in the present embodiment, in comparison with the fifth embodiment, a heat transfer pipe constituting the second high-pressure superheater 113 can be formed of an inexpensive material, and the wall thickness of this heat transfer pipe can be reduced.

As in each of the aforementioned embodiments, since the gas turbine plant of the present embodiment also includes a supplied water heater 78 and a supplied water cooler 79, a temperature of the supplied water flowing into the exhaust heat recovery boiler 100e can be regulated to a target temperature.

Seventh Embodiment

Figure 11:
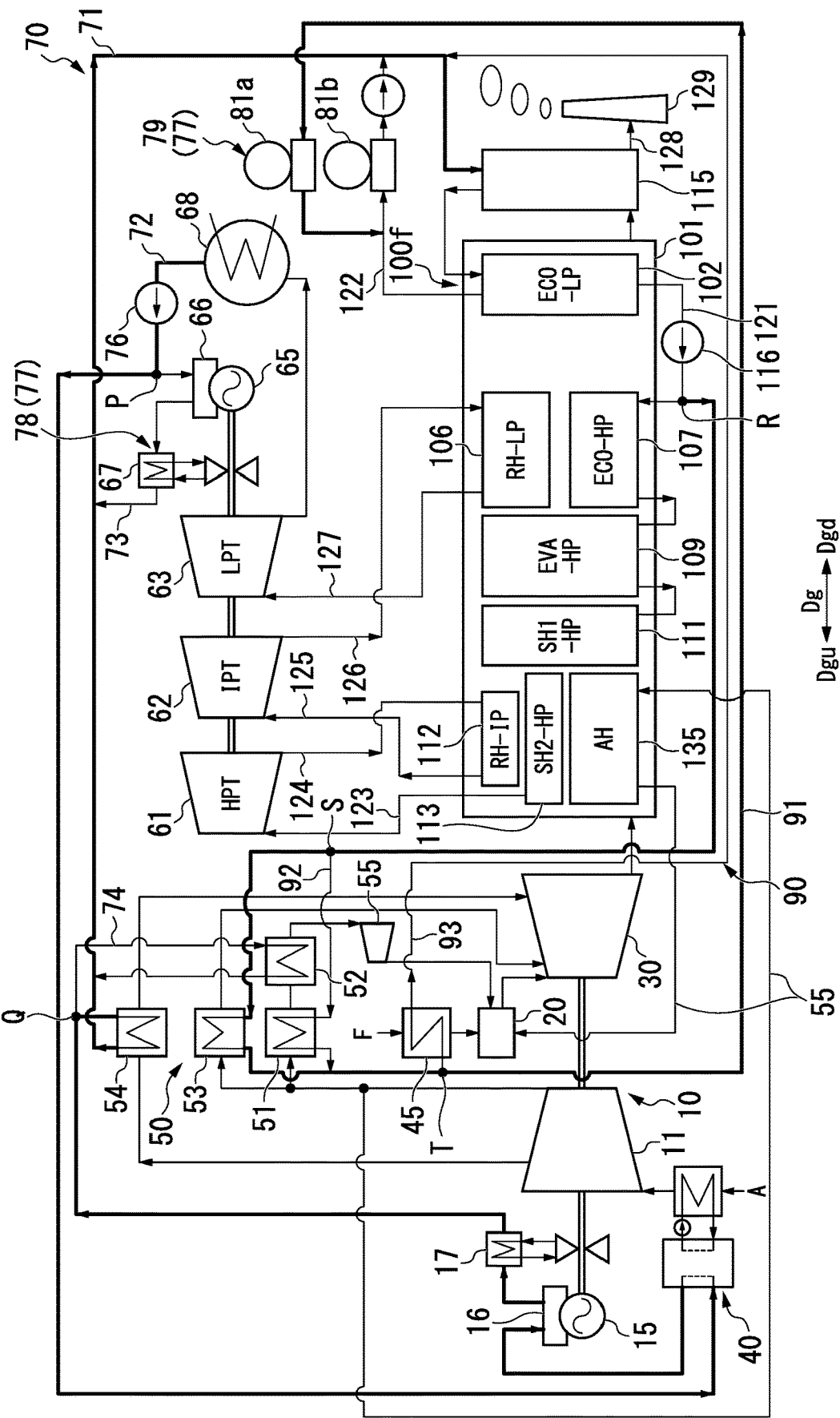
FIG. 11 is a system diagram of a gas turbine plant in a seventh embodiment according to the present invention.

A seventh embodiment of the gas turbine plant according to the present invention will be described with reference to FIG. 11.

An exhaust heat recovery boiler 100f of the present embodiment has an air heater 135 in addition to the components of the exhaust heat recovery boiler 100 of the first embodiment. The air heater 135 is disposed in a boiler outer frame 101 at a portion at which a second high-pressure superheater 113 and an intermediate-pressure reheater 112 are located in an upstream/downstream direction Dg. A compressed airline 56, which guides compressed air generated by an air compressor 11 to an combustor 20, is connected to the air heater 135. Therefore, part of the compressed air from the air compressor 11 is heated by the air heater 135 in the boiler outer frame 101, and then flows from the compressed air line 56 to the combustor 20.

For this reason, in the present embodiment, in comparison with the above embodiments, high-temperature compressed air can be supplied to the combustor 20. Therefore, in the present embodiment, fuel consumption in the combustor 20 can be reduced.

As in each of the aforementioned embodiments, since the gas turbine plant of the present embodiment also includes a supplied water heater 78 and a supplied water cooler 79, a temperature of the supplied water flowing into the exhaust heat recovery boiler 100f can be regulated to a target temperature.

Eighth Embodiment

Figure 12:
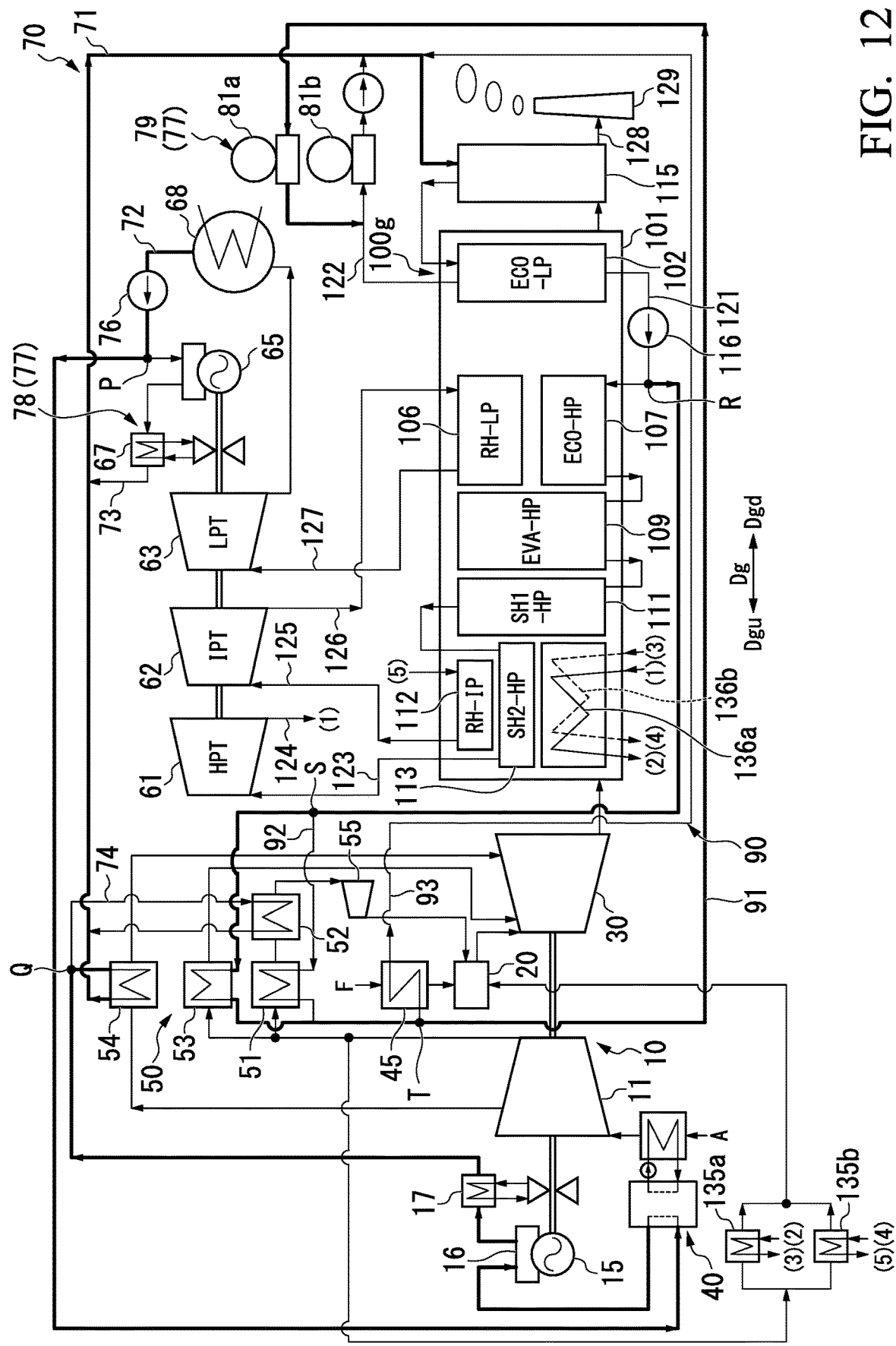
FIG. 12 is a system diagram of a gas turbine plant in an eighth embodiment according to the present invention.

An eighth embodiment of the gas turbine plant according to the present invention will be described with reference to FIG. 12.

Like the seventh embodiment, the gas turbine plant of the present embodiment also has air heaters 135a and 135b that heat compressed air generated by an air compressor 11. In the present embodiment, the air heaters 135a and 135b are a first air heater 135a and a second air heater 135b. However, the first air heater 135a and the second air heater 135b are disposed outside a boiler outer frame 101 of an exhaust heat recovery boiler 100g. The first air heater 135a and the second air heater 135b heat the compressed air by means of steam. The first air heater 135a and the second air heater 135b are provided on a compressed air line 56 in parallel to each other.

In place of the air heater 135 of the seventh embodiment, a first resuperheater 136a and a second resuperheater 136b are disposed in the boiler outer frame 101 of the present embodiment. The first resuperheater 136a and the second resuperheater 136b superheat steam using an exhaust gas.

A steam inlet of the first resuperheater 136a is connected to a steam outlet of a high-pressure steam turbine 61 via a high-pressure exhaust line 124. A steam outlet of the first resuperheater 136a is connected to a steam inlet of the first air heater 135a. A steam outlet of the first air heater 135a is connected to a steam inlet of the second resuperheater 136b. A steam outlet of the second resuperheater 136b is connected to a steam inlet of the second air heater 135b. A steam outlet of the second air heater 135b is connected to an intermediate-pressure reheater 112.

Steam exhausted from the high-pressure steam turbine 61 flows into the first resuperheater 136a in the boiler outer frame 101 via the high-pressure exhaust line 124. The steam flowing into the first resuperheater 136a is superheated by the exhaust gas. The steam superheated by the first resuperheater 136a heats compressed air from an air compressor 11 by means of the first air heater 135a. The compressed air heated by the first air heater 135a flows into a combustor 20. The steam that heats the compressed air by means of the first air heater 135a is superheated by the exhaust gas at the second resuperheater 136b in the boiler outer frame 101. The steam superheated by the second resuperheater 136b heats the compressed air from the air compressor 11 by means of the second air heater 135b. The compressed air heated by the second air heater 135b flows into the combustor 20. The steam that heats the compressed air by means of the second air heater 135b is heated by the intermediate-pressure reheater 112, and then flows into an intermediate-pressure steam turbine 62 via an intermediate-pressure steam line 125.

In the present embodiment, the first air heater 135a and the second air heater 135b allow heat exchange between the compressed air from the air compressor 11 and the steam, and heat the compressed air. That is, in the present embodiment, the compressed air is heated by the steam having a high heat transfer coefficient and a high heat density. Therefore, in the present embodiment, the first air heater 135a and the second air heater 135b can be downsized. In the present embodiment, since the heating of the compressed air and the superheating of the steam are performed in a double loop, the temperature of the compressed air can be increased.

As in each of the aforementioned embodiments, since the gas turbine plant of the present embodiment also includes a supplied water heater 78 and a supplied water cooler 79, a temperature of the supplied water flowing into the exhaust heat recovery boiler 100g can be regulated to a target temperature.

Ninth Embodiment

Figure 13:
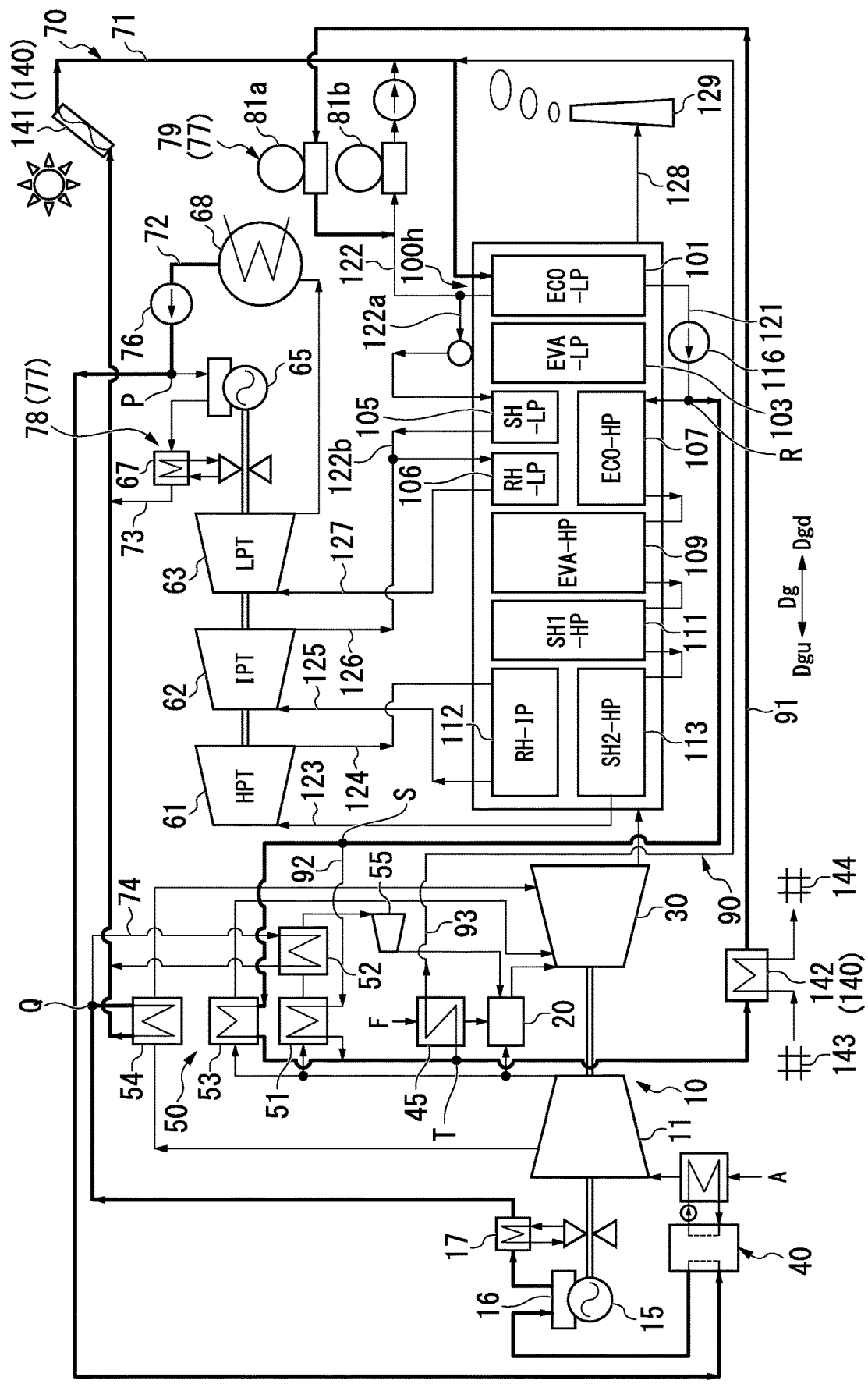
FIG. 13 is a system diagram of a gas turbine plant in a ninth embodiment according to the present invention.

A ninth embodiment of the gas turbine plant according to the present invention will be described with reference to FIG. 13.

The gas turbine plant of the present embodiment is a plant in which external heaters 140 that heat water or the like using a heat source outside the gas turbine plant are added to the supplied water heater 78 and the gas turbine heat capacity regulator in the gas turbine plant of the second embodiment. An exhaust heat recovery boiler 100h in the gas turbine plant of the present embodiment is a boiler in which the low-temperature heat exchanger 115 is omitted from the exhaust heat recovery boiler 100a of the second embodiment.

The external heaters 140 in the present embodiment are a solar heater 141 and a geothermal heat exchanger 142. The solar heater 141 is provided on a water supply main line 72 as a supplied water heater 78. The solar heater 141 receives sunlight to heat supplied water flowing through the water supply main line 72. The geothermal heat exchanger 142 allows heat exchange between hot water from a geothermal production well 143 and heated water flowing through a GTHC main line 91, and heats the heated water. The hot water from the geothermal production well 143 which heats the heated water is sent to a geothermal injection well 144.

As described above, the external heaters 140, which heat water or the like using a heat source (solar heat or terrestrial heat) outside the gas turbine plant, may be used as the supplied water heater 78 and the gas turbine heat capacity regulator. Combustion heat of biomass fuel or waste, factory exhaust heat, heat of an exhaust gas of an engine, heat of jacket cooling water, and so on may be used as the heat source that heats water or the like in the external heater 140.

As described above, the heat source outside the gas turbine plant is used, and thereby the gas turbine plant and the outside are combined to increase heat utilization efficiency as a whole.

The present embodiment is a modification of the second embodiment. However, in other embodiments, as in the present embodiment, the external heater 140 may be used as the supplied water heater 78, and the external heater 140 may be used as the gas turbine heat capacity regulator.

Tenth Embodiment

Figure 14:
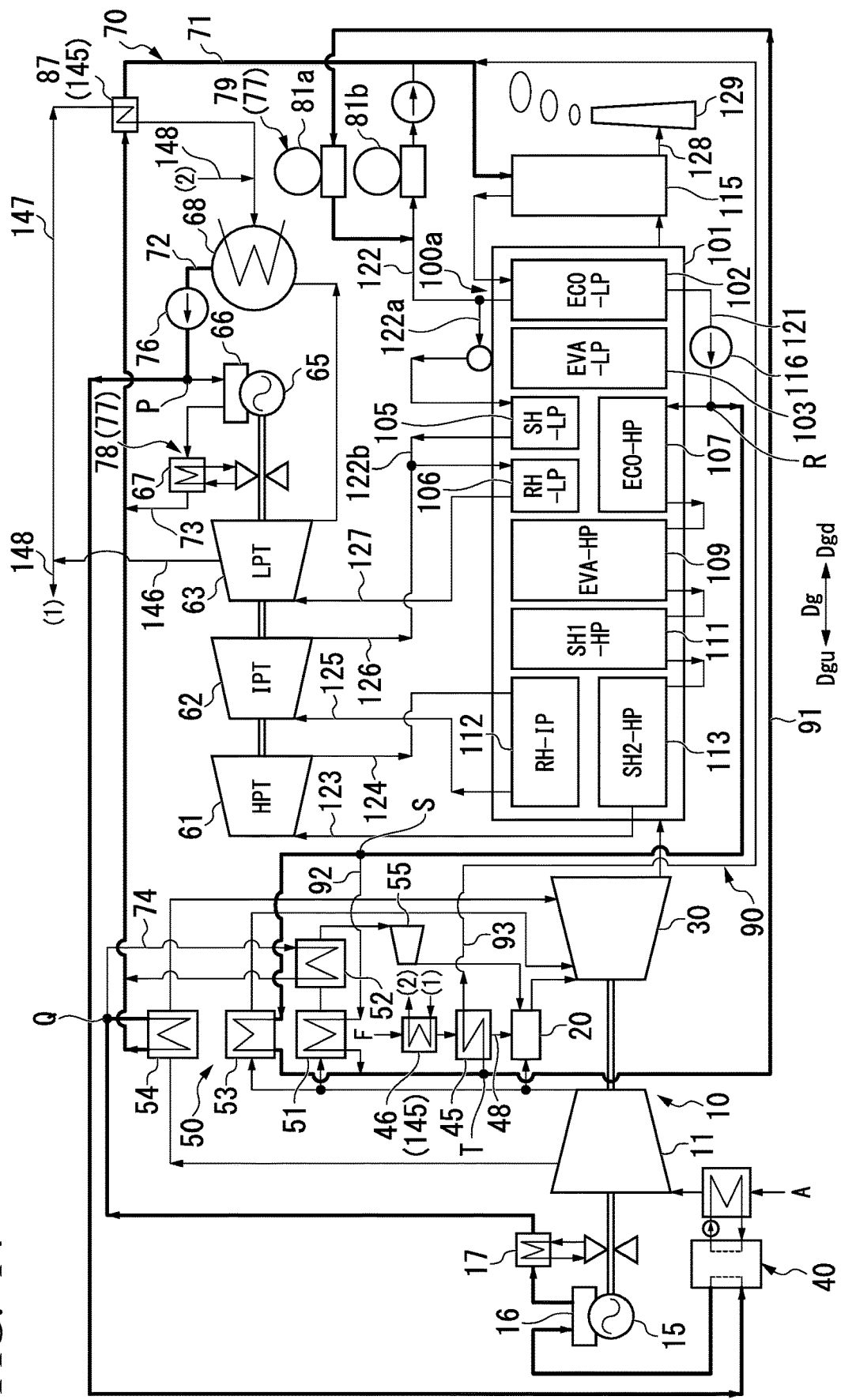
FIG. 14 is a system diagram of a gas turbine plant in a tenth embodiment according to the present invention.

A tenth embodiment of the gas turbine plant according to the present invention will be described with reference to FIG. 14.

The gas turbine plant of the present embodiment is a plant in which steam heat exchangers (steam coolers) 145 that heat water or fuel using steam are added to the supplied water heater 78 and the gas turbine heat capacity regulator in the gas turbine plant of the second embodiment.

The steam heat exchangers 145 in the present embodiment are a low-pressure steam heat exchanger 87 and a primary fuel preheater 46. The low-pressure steam heat exchanger 87 is provided on a water supply main line 72 as the supplied water heater 78. The low-pressure steam heat exchanger 87 allows heat exchange between low-pressure steam extracted from the low-pressure steam turbine 63 and supplied water flowing through the water supply main line 72, and heats the supplied water. The primary fuel preheater 46 is provided on a fuel line 48 that supplies the fuel to a combustor 20. The fuel preheater 45 described above is provided at a downstream side of a flow of the fuel relative to the primary fuel preheater 46 on the fuel line 48. The primary fuel preheater 46 allows heat exchange between the low-pressure steam extracted from the low-pressure steam turbine 63 and the fuel F, and heats the fuel F.

An extraction line 146 is connected to a position of a middle stage of the low-pressure steam turbine 63. The extraction line 146 branches off into two on the way. A first extraction branch line 147 is connected to a steam condenser 68. The low-pressure steam heat exchanger 87 is provided on the first extraction branch line 147. Therefore, part of the low-pressure steam extracted from the low-pressure steam turbine 63 flows into the low-pressure steam heat exchanger 87 via the first extraction branch line 147, and then flows into the steam condenser 68 via the first extraction branch line 147 again. A second extraction branch line 148 is connected to the steam condenser 68. The primary fuel preheater 46 is provided on the second extraction branch line 148. Therefore, the other part of the low-pressure steam extracted from the low-pressure steam turbine 63 flows into the primary fuel preheater 46 via the second extraction branch line 148, and then flows into the steam condenser 68.

As described above, the steam heat exchangers (the steam coolers) 145 that heat water or the like using the low-pressure steam may be used as the supplied water heater 78 and the gas turbine heat capacity regulator.

In the present embodiment, the low-pressure steam is used to heat water or the like, and thereby an amount of high-pressure steam having a high value in use can be relatively increased. For this reason, efficiency of the gas turbine plant can be improved.

As described above, the present embodiment is a modification of the second embodiment. However, in the other embodiments, as in the present embodiment, the low-pressure steam may be used to heat water or the like.

Eleventh Embodiment

Figure 15:
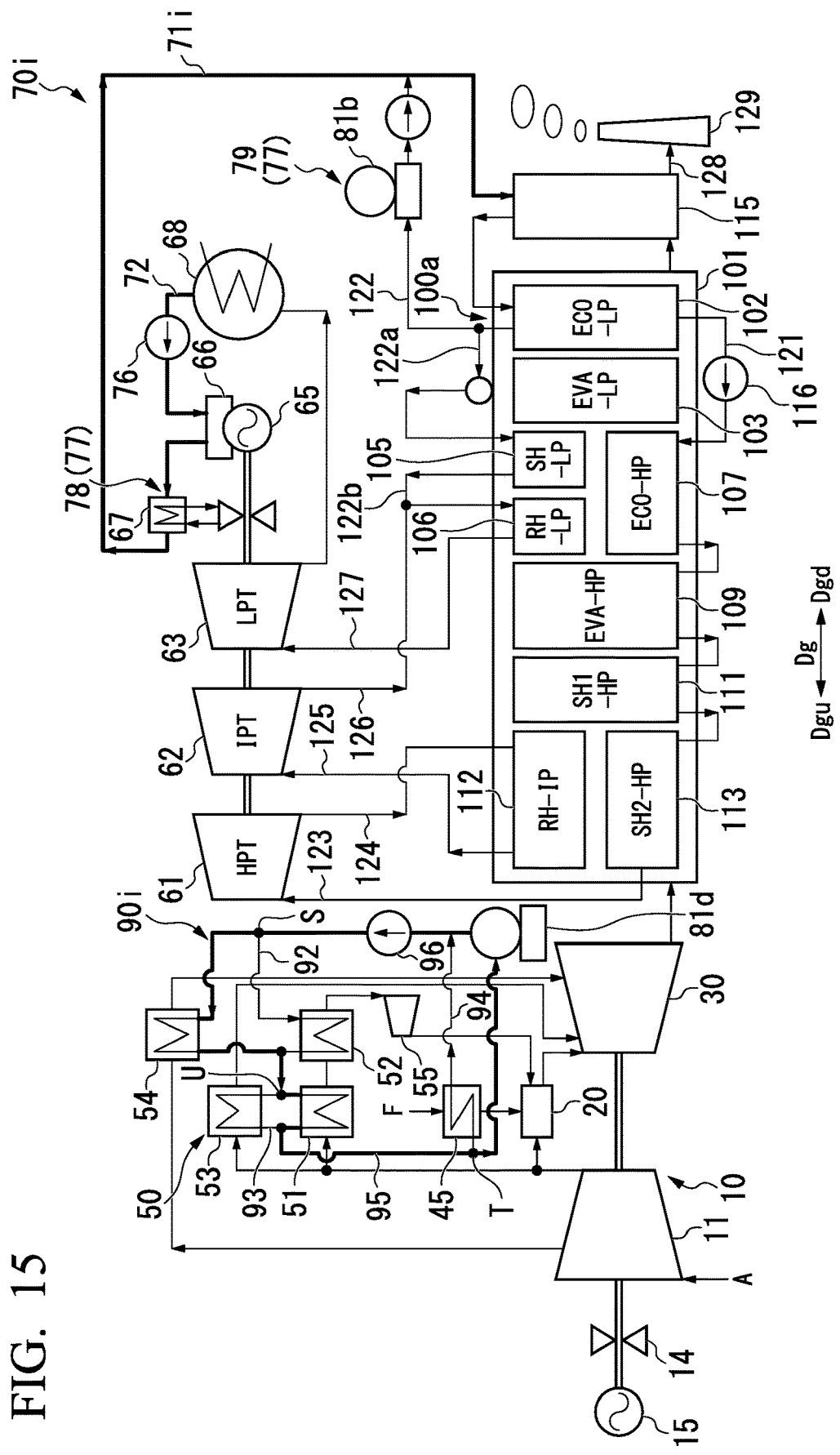
FIG. 15 is a system diagram of a gas turbine plant in an eleventh embodiment according to the present invention.

An eleventh embodiment of the gas turbine plant according to the present invention will be described with reference to FIG. 15.

In any of the embodiments, the water flowing along the water supply line 71 and the water flowing along the GTHC line 90 are combined. In the present embodiment, water flowing along a water supply line 71 and a medium flowing along a GTHC line 90i are not combined. That is, in the present embodiment, the GTHC line 90i is a line independent of the water supply line 71.

The gas turbine plant of the present embodiment is a modification of the gas turbine plant of the second embodiment. An exhaust heat recovery boiler 100a of the present embodiment is the same as the exhaust heat recovery boiler 100a of the second embodiment.

As in the aforementioned embodiments, the water supply line 71i in a water supply system 70i of the present embodiment is a line that connects a steam condenser 68 and the exhaust heat recovery boiler 100a. A generator cooler 66 and a lubricant cooler 67 related to a generator 65 are provided on the water supply line 71i. However, like the gas turbine plant of the second embodiment, an intake air freezer 42, a generator cooler 16 and a lubricant cooler 17 related to a generator 15, and a fourth air cooler 54 are not provided on the water supply line 71i of the present embodiment. That is, in the present embodiment, the generator cooler 66 and the lubricant cooler 67 related to the generator 65 constitute a supplied water heater 78.

As in each of the aforementioned embodiments, a second Rankine cycle 81b is provided on a second heated water line 122 that connects a low-pressure economizer 102 and the water supply line 71i. In the present embodiment, only the second Rankine cycle 81b constitutes a supplied water cooler 79.

The GTHC line 90i of the present embodiment has a circulation line 95, a first GTHC branch line 92, a second GTHC branch line 93, and a third GTHC branch line 94. In the circulation line 95, a medium flowing through the inside circulates. The first GTHC branch line 92, the second GTHC branch line 93, and the third GTHC branch line 94 branch off from the circulation line 95, and are connected to the circulation line 95 again.

A medium pump 96 that boosts a pressure of the medium flowing through the inside is provided on the circulation line 95.

A third Rankine cycle 81d is provided on the circulation line 95. The third Rankine cycle 81d is the low-boiling-point medium Rankine cycle described above. The third Rankine cycle 81d allows heat exchange between a low-boiling-point medium flowing through the Rankine cycle and a medium flowing along the circulation line 95, and cools the medium flowing along the circulation line 95.

The first GTHC branch line 92 branches off from a position located at a downstream side of a flow of the medium relative to a position at which the medium pump 96 is provided on the circulation line 95, and is connected to the circulation line 95 at a position located at a downstream side from this branch position. A second air cooler 52 is provided on the first GTHC branch line 92. A fourth air cooler 54 is provided between the branch position of the first GTHC branch line 92 on the circulation line 95 and a connection position thereof.

The second GTHC branch line 93 branches off from a position located at a downstream side of the flow of the medium relative to a connection position of the first GTHC branch line 92 on the circulation line 95, and is connected to the circulation line 95 at a position located at a downstream side from this branch position. A third air cooler 53 is provided on the second GTHC branch line 93. A first air cooler 51 is provided between the branch position of the second GTHC branch line 93 on the circulation line 95 and a connection position thereof.

The third GTHC branch line 94 branches off from a position that is located at a downstream side of the flow of the medium relative to a connection position of the second GTHC branch line 93 on the circulation line 95 and is located at an upstream side from a position at which the third Rankine cycle 81d is installed. The third GTHC branch line 94 is connected between the position at which the third Rankine cycle 81d is installed and a position at which the medium pump 96 is installed on the circulation line 95. A fuel preheater 45 is provided on the third GTHC branch line 94.

A noninflammable medium that is not ignited even when mixed with air of a high temperature (300° C. or higher) flows along the GTHC line 90i of the present embodiment. The noninflammable medium may be, for instance, water, synthetic fiber organic heat medium oil, carbon dioxide, nitrogen, or the like. The synthetic fiber organic heat medium oil may be, for instance, oil composed mainly of dibenzyltoluene.

The medium discharged from the medium pump 96 is sent to the fourth air cooler 54, the second air cooler 52, the third air cooler 53, and the first air cooler 51 via the circulation line 95 of the GTHC line 90i. These air coolers 54 to 51 allow heat exchange between the medium and the air from the air compressor 11, and cool the air while heating the medium. Part of the medium heated by these air coolers 54 to 51 flows into the fuel preheater 45. The fuel preheater 45 allows heat exchange between the medium and the fuel F. and cools the medium while heating the fuel F. The other part of the medium heated by these air coolers 54 to 51 flows into an evaporator of the third Rankine cycle 81d. The evaporator of the third Rankine cycle 81d allows heat exchange between the medium and the low-boiling-point medium, and cools the medium while heating and evaporating the low-boiling-point medium. The medium passing through the fuel preheater 45 and the medium passing through the third Rankine cycle 81d are drawn into the medium pump 96, and are discharged from the medium pump 96.

As described above, the GTHC line 90i may be provided independently of the water supply line 71i. In the present embodiment, since the GTHC line 90i is provided independently of the water supply line 71i, only the gas turbine 10 can be driven without driving the steam turbines. In the present embodiment, since the third Rankine cycle 81*d* is provided on the GTHC line 90*i*, heat obtained in the process in which the medium flows along the GTHC line 90*i* can be effectively used.

As described above, the present embodiment is a modification of the second embodiment. However, in the other embodiments, as in the present embodiment, the GTHC line 90 may be provided independently of the water supply line 71.

In the present embodiment, the second Rankine cycle 81*b* that is the heat absorbing device constitutes the supplied water cooler 79. However, as described above, the heat absorbing device may also function as the supplied water heater.

Twelfth Embodiment

Figure 16:
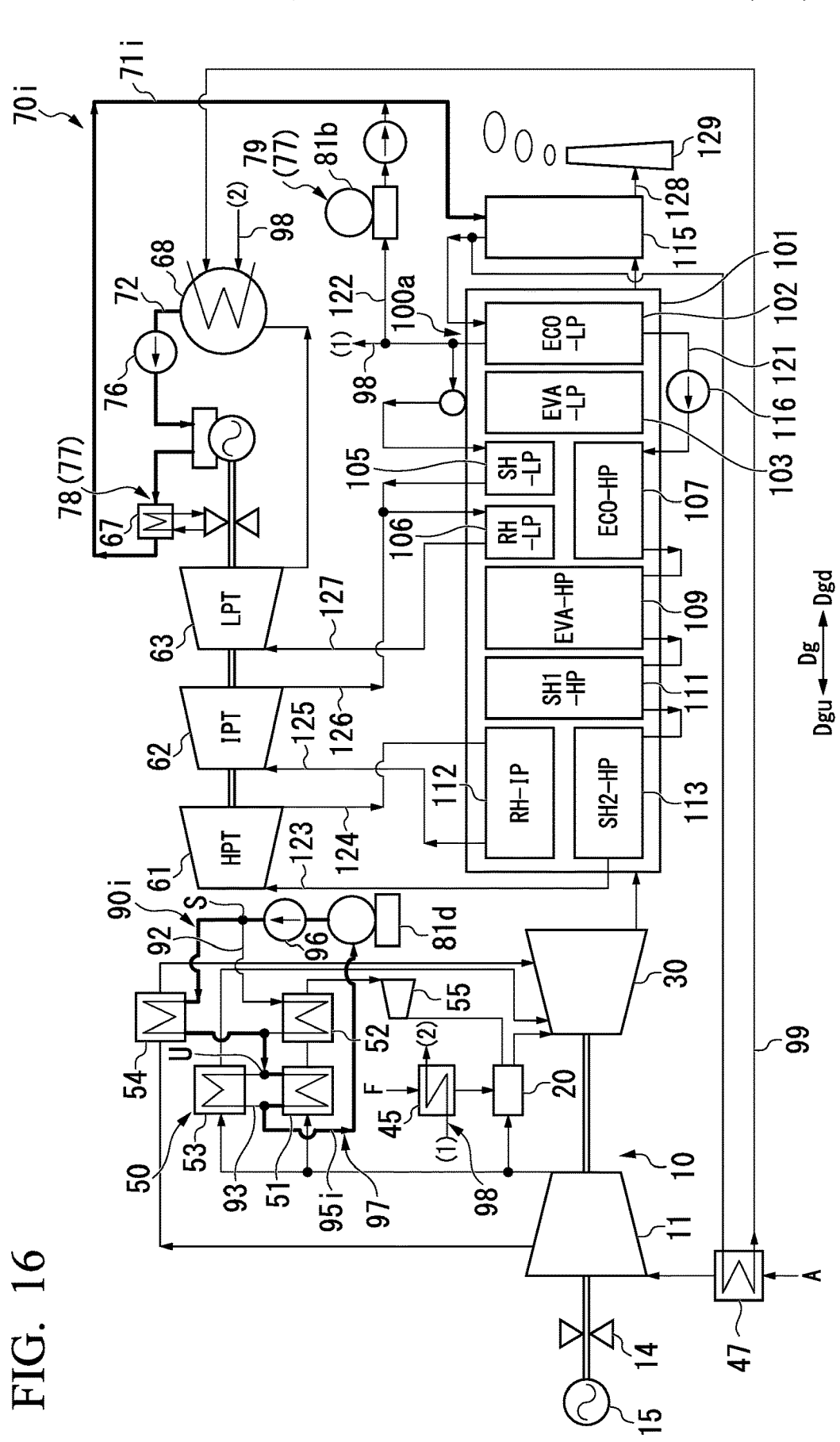
FIG. 16 is a system diagram of a gas turbine plant in a twelfth embodiment according to the present invention.

A twelfth embodiment of the gas turbine plant according to the present invention will be described with reference to FIG. 16.

The gas turbine plant of the present embodiment is a modification of the gas turbine plant of the eleventh embodiment.

A water supply line 71*i* of the present embodiment and a supplied water heater 78 provided on the water supply line 71*i* are the same as in the eleventh embodiment. Meanwhile, a GTHC line 90*j* of the present embodiment and devices provided on the GTHC line 90*j* are different from those of the eleventh embodiment.

The GTHC line 90*j* of the present embodiment has a circulatory system GTHC line 97, a first discharge system GTHC line 98, and a second discharge system GTHC line 99. The circulatory system GTHC line 97 has a circulation line 95*i*, a first GTHC branch line 92, and a second GTHC branch line 93. In the circulation line 95*i*, a medium flowing through the inside circulates. The first GTHC branch line 92 and the second GTHC branch line 93 branch off from the circulation line 95*i*, and are connected to the circulation line 95*i* again.

Like the eleventh embodiment, a medium pump 96 and a third Rankine cycle 81*d* are provided on the circulation line 95*i*.

The first GTHC branch line 92 branches off from a position S located at a downstream side of a flow of a medium relative to a position at which the medium pump 96 is provided on the circulation line 95*i*, and is connected to the circulation line 95*i* at a position located at a downstream side from this branch position S. A second air cooler 52 is provided on the first GTHC branch line 92. A fourth air cooler 54 is provided between the branch position S of the first GTHC branch line 92 on the circulation line 95*i* and a connection position thereof.

The second GTHC branch line 93 branches off from a position U located at a downstream side of the flow of the medium relative to a connection position of the first GTHC branch line 92 on the circulation line 95*i*, and is connected to the circulation line 95*i* at a position located at a downstream side from this branch position U. A third air cooler 53 is provided on the second GTHC branch line 93. A first air cooler 51 is provided between the branch position of the second GTHC branch line 93 on the circulation line 95*i* and a connection position thereof.

Like the eleventh embodiment, the medium discharged from the medium pump 96 is sent to the fourth air cooler 54, the second air cooler 52, the third air cooler 53, and the first air cooler 51 via the circulation line 95*i*. These air coolers 54 to 51 allow heat exchange between the medium and air from the air compressor 11, and cool the air while heating the medium. The medium heated by these air coolers 54 to 51 flows into an evaporator of the third Rankine cycle 81*d*. The evaporator of the third Rankine cycle 81*d* allows heat exchange between the medium and the low-boiling-point medium, and cools the medium while heating and evaporating the low-boiling-point medium. The medium passing through the third Rankine cycle 81*d* is drawn into the medium pump 96, and is discharged from the medium pump 96.

The first discharge system GTHC line 98 connects a second heated water line 122 and a steam condenser 68. A fuel preheater 45 is provided on the first discharge system GTHC line 98. Low-pressure heated water that is supplied water heated by a low-pressure economizer 102 flows into the fuel preheater 45 via the second heated water line 122 and the first discharge system GTHC line 98. The fuel preheater 45 allows heat exchange between the fuel F and the low-pressure heated water, and heats the fuel F while cooling the low-pressure heated water. The low-pressure heated water cooled by the fuel preheater 45 flows into the steam condenser 68 via the first discharge system GTHC line 98.

The second discharge system GTHC line 99 connects the low-temperature heat exchanger 115 and the steam condenser 68. An intake air heater 47 is provided on the second discharge system GTHC line 99. Air A drawn in by the air compressor 11 flows through the intake air heater 47. The intake air heater 47 allows heat exchange between the air A drawn in by the air compressor 11 and the supplied water heated by the low-temperature heat exchanger 115, and heats the air A while cooling the supplied water. The supplied water cooled by the intake air heater 47 flows into the steam condenser 68 via the second discharge system GTHC line 99.

In the present embodiment, the intake air heater 47 heats the air A drawn in by the air compressor 11. When the air A drawn in by the air compressor 11 is heated and rises in temperature, a mass flow rate of the air A drawn in by the air compressor 11 is reduced. Therefore, when the temperature of the air A drawn in by the air compressor 11 rises, a gas turbine output is reduced. In the present embodiment, when a power demand is low and a gas turbine 10 is operated at a low load, the intake air heater 47 heats the air A drawn in by the air compressor 11. In the present embodiment, the intake air heater 47 constantly heats the air A. and stops heating the air A drawn in by the air compressor 11 when the power demand is increased. Therefore, in the present embodiment, an output variation range of the gas turbine 10 can be increased.

As described above, the present embodiment is a modification of the eleventh embodiment. However, in the other embodiments, as in the present embodiment, the intake air heater 47 may be provided.

Thirteenth Embodiment

Figure 17:
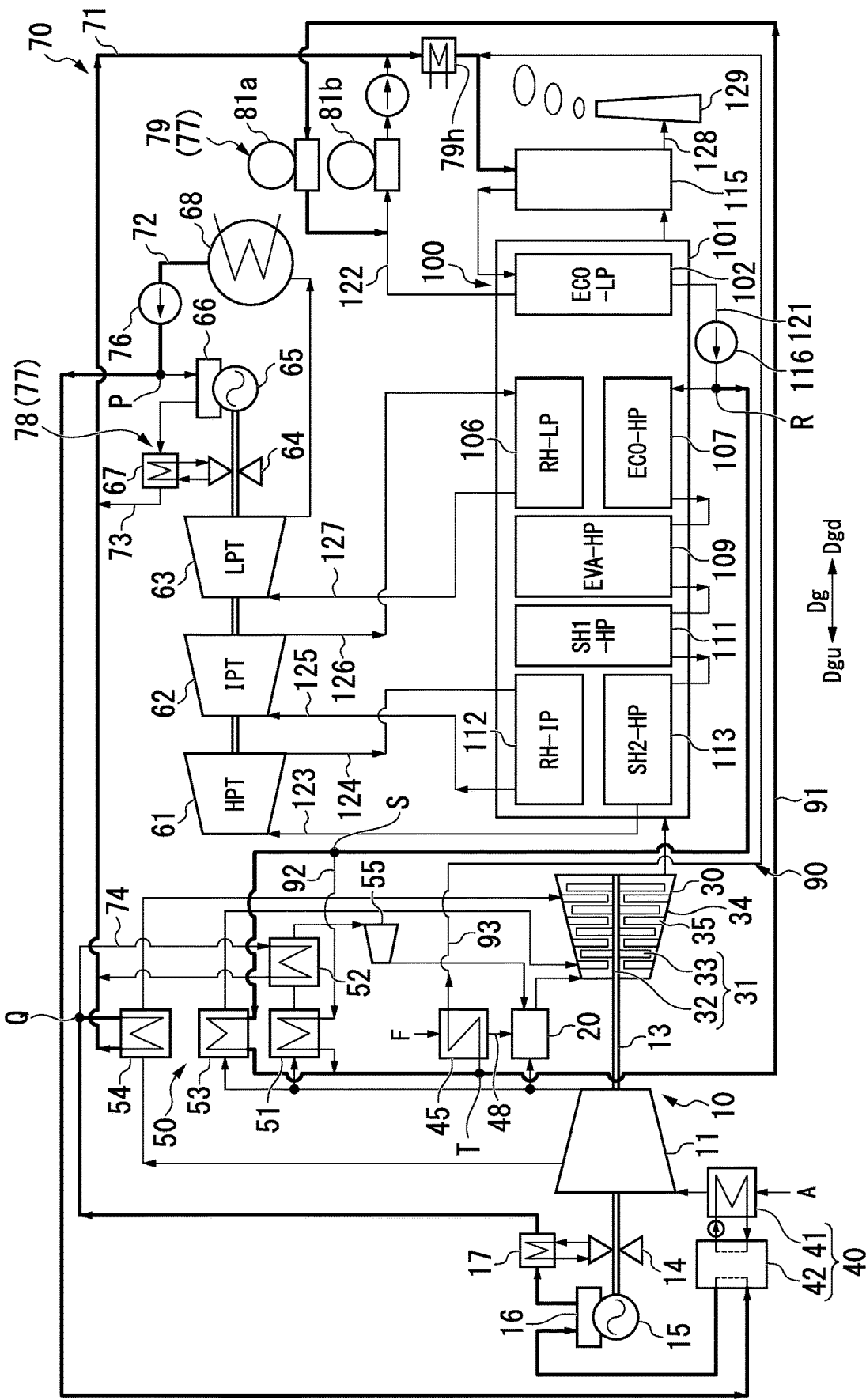
FIG. 17 is a system diagram of a gas turbine plant in a thirteenth embodiment according to the present invention.

A thirteenth embodiment of the gas turbine plant according to the present invention will be described with reference to FIG. 17.

The gas turbine plant of the present embodiment is a modification of the gas turbine plant of the first embodiment.

A supplied water cooler 79*h* is provided on a water supply main line 72 of the present embodiment. To be specific, the supplied water cooler 79*h* is provided at a position located at a downstream side of a flow of supplied water relative to a connection position of a second heated water line 122 on the water supply main line 72. For example, the supplied water cooler 79h allows heat exchange between a medium having a lower temperature than the supplied water and the supplied water, and reduces the temperature of the supplied water. Heat of the medium heated by the heat exchange with the supplied water can be used, for instance, in a heat source of hot water supply, air conditioning of a building or a greenhouse, or the like.

In the present embodiment, as in each of the aforementioned embodiments, a supplied water heater 78 and supplied water coolers 79 and 79h are provided, and thus a temperature of the supplied water flowing into the exhaust heat recovery boiler 100 can be regulated to a target temperature. Therefore, in the present embodiment, since a temperature of an exhaust gas exhausted from the exhaust heat recovery boiler 100 can be regulated, heat of the exhaust gas can be effectively used, and simultaneously corrosion of a flue 128 or the like caused by condensation of NOx and SOx contained in the exhaust gas can be suppressed.

<Various Modifications>

A supplied water heater 78 of each of the aforementioned embodiments has a plurality of devices that heat supplied water. However, the supplied water heater 78 need not have all the devices, and need only have at least one of the devices.

The gas turbine plant of each of the aforementioned embodiments includes the supplied water heater 78 and a supplied water cooler 79. However, the gas turbine plant may include only one of the supplied water heater 78 and the supplied water cooler 79. For example, when the gas turbine plant includes only the supplied water heater 78, a temperature of supplied water flowing into a water supply line 71 from a steam condenser 68 is set to be low, and the supplied water heater 78 heats the supplied water to regulate the temperature of the supplied water flowing into the exhaust heat recovery boiler 100 to a target temperature. When the gas turbine plant includes only the supplied water cooler 79, the temperature of the supplied water flowing into the water supply line 71 from the steam condenser 68 is set to be high, and the supplied water cooler 79 cools the supplied water to regulate the temperature of the supplied water flowing into the exhaust heat recovery boiler 100 to the target temperature.

INDUSTRIAL APPLICABILITY

According to an aspect of the present invention, a temperature of an exhaust gas exhausted from an exhaust heat recovery boiler can be regulated.

REFERENCE SIGNS LIST

10 Gas turbine
11 Air compressor
13 Gas turbine rotor
14 Bearing
15 Generator
16 Generator cooler
17 Lubricant cooler
20 Combustor
21 Fuel injector
22 Burner
23 Burner support tube
25 Transition piece
26 Cooling air flow passage
27 Air inlet
28 Air outlet
31 Turbine rotor
32 Rotor shaft
33 Turbine blade row
34 Turbine casing
35 Turbine vane row
40 intake air cooler
41 Intake air heat exchanger
42 Intake air freezer
45 Fuel preheater
46 Primary fuel preheater
47 Intake air heater
48 Fuel line
49 Auxiliary fuel line
50 Cooling air cooler
51 First air cooler
52 Second air cooler
53 Third air cooler
54 Fourth air cooler
55 Boost compressor
56 Compressed air line
61 High-pressure steam turbine
62 Intermediate-pressure steam turbine
63 Low-pressure steam turbine
65 Generator
64 Bearing
66 Generator cooler
67 Lubricant cooler
68 Steam condenser (water supply source)
70, 70i Water supply system
71, 71i Water supply line
72 Water supply main line
73 First water supply branch line
74 Second water supply branch line
75a Flow rate regulating valve
75b Bypass amount regulating valve
76 Water supply pump
77 Supplied water temperature regulator
78 Supplied water heater
79, 79c, 79h Supplied water cooler
81a First low-boiling-point medium Rankine cycle (first Rankine cycle)
81b Second low-boiling-point medium Rankine cycle (second Rankine cycle)
81c Low-boiling-point medium Rankine cycle (Rankine cycle)
81d Third Rankine cycle
82 Evaporator
82a First evaporator
82b Second evaporator
83 Turbine
83a First turbine
83b Second turbine
84 Condenser
85 Low-boiling-point medium pump
85a First low-boiling-point medium pump
85b Second low-boiling-point medium pump
86 Low-boiling-point medium line
87 Low-pressure steam heat exchanger
89, 89c Generator
90, 90i, 90j Gas turbine heat capacity regulating line (GTHC line)
91 Gas turbine heat capacity regulating main line (GTHC main line)
92 First gas turbine heat capacity regulating branch line (first GTHC branch line)

93 Second gas turbine heat capacity regulating branch line (second GTHC branch line)
94 Third gas turbine heat capacity regulating branch line (third GTHC branch line)
95, 95i Circulation line
96 Medium pump
97 Circulatory system GTHC line
98 First discharge system GTHC line
99 Second discharge system GTHC line
100, 100a, 100b, 100c, 100d, 100e, 100f, 100g, 100h Exhaust heat recovery boiler
101 Boiler outer frame
102 Low-pressure economizer
103 Low-pressure evaporator
104 First high-pressure economizer
105 First low-pressure superheater (low-pressure superheater)
106 Low-pressure reheater (reheater)
106c First intermediate-pressure reheater (reheater)
107 High-pressure economizer
107c Second high-pressure economizer
108 Second low-pressure superheater
109 High-pressure evaporator
111 First high-pressure superheater
112 Intermediate-pressure reheater
112c Second intermediate-pressure reheater
113 Second high-pressure superheater
115 Low-temperature heat exchanger
116 High-pressure pump
121 First heated water line
121c High-temperature heated water line
122 Second heated water line
122a Heated water supply line
122b Low-pressure superheated steam line
123 High-pressure steam line
124 High-pressure exhaust line
125 Intermediate-pressure steam line
126 Intermediate-pressure exhaust line
127 Low-pressure steam line
128 Flue
129 Chimney
131 Auxiliary combustor
132 Flow passage branch plate
133 First flow passage
134 Second flow passage
135 Air heater
135a First air heater
135b Second air heater
136a First resuperheater
136b Second resuperheater
140 External heater
141 Solar heater
142 Geothermal heat exchanger
143 Geothermal production well
145 Steam heat exchanger (steam cooler)
146 Extraction line
147 First extraction branch line
148 Second extraction branch line

The invention claimed is:

1. A gas turbine plant comprising:
a gas turbine;
an exhaust heat recovery boiler configured to generate steam using heat of an exhaust gas from the gas turbine; and
a water supply system configured to supply water to the exhaust heat recovery boiler,
wherein:
the exhaust heat recovery boiler has: an economizer that is configured to heat the water with the exhaust gas; an evaporator that is configured to heat the water with the exhaust gas and generate steam, the water being heated by the economizer; and a reheater that is configured to heat steam with the exhaust gas introduced from the evaporator;
the water supply system has a water supply line that is configured to send water from a water supply source to the exhaust heat recovery boiler, and a supplied water temperature regulator that is configured to regulate a temperature of supplied water that is the water flowing along the water supply line; and
the supplied water temperature regulator has a supplied water heater that is configured to heat the supplied water, and a supplied water cooler that is configured to cool boiler circulation water that is water flowing through the exhaust heat recovery boiler, mix the boiler circulation water after being cooled and the boiler circulation water that is water flowing through the exhaust heat recovery boiler to obtain mixed water, and mix the mixed water with the water flowing the water supply line so as to cool the water flowing into the exhaust heat recovery boiler.

2. The gas turbine plant according to claim 1, wherein the supplied water cooler has a heat absorbing device that is configured to absorb heat from the boiler circulation water that has passed through the exhaust heat recovery boiler, reduce a temperature of the boiler circulation water, and mix the boiler circulation water into the supplied water.

3. The gas turbine plant according to claim 1, wherein:
the gas turbine has a compressor that is configured to compress air, a combustor that is configured to burn fuel in the air compressed by the compressor and generate a combustion gas, and a turbine that is configured to be driven by the combustion gas; and
the supplied water heater has a heat transfer device that is configured to transfer heat to the supplied water from a cooling target in the gas turbine, cool the cooling target, and heat the supplied water.

4. The gas turbine plant according to claim 3, wherein the heat transfer device includes at least one of:
a cooling air cooler configured to use part of the compressed air from the compressor as the cooling target, and exchange heat with the supplied water to cool the compressed air and send the compressed air to cool high-temperature components exposed to the combustion gas in the gas turbine;
an intake air cooler configured to use the air drawn in by the compressor as the cooling target, and transfer heat from the air to the supplied water to cool the air and send the cooled air to the compressor; or
a lubricant cooler configured to use a lubricant from a bearing that is configured to rotatably support a rotor of the gas turbine as the cooling target, and exchange heat with the supplied water to cool the lubricant and return the cooled lubricant to the bearing.

5. The gas turbine plant according to claim 1, further comprising a generator configured to generate electricity and be driven by the gas turbine,
wherein the supplied water heater has a generator cooler that is configured to allow heat exchange between a cooling medium for cooling components of the generator and the supplied water, and cool the cooling medium.

6. The gas turbine plant according to claim 1, further comprising:
   steam turbines configured to be driven by steam generated by the exhaust heat recovery boiler; and
   a generator configured to generate electricity and be driven by the steam turbines,
   wherein the supplied water heater includes at least one of:
   a lubricant cooler that is configured to allow heat exchange between a lubricant from a bearing that is configured to rotatably support a rotor for the steam turbines and the supplied water, cool the lubricant, and return the cooled lubricant to the bearing;
   a generator cooler that is configured to allow heat exchange between a cooling medium for cooling components of the generator and the supplied water, and cool the cooling medium; or
   a steam cooler that is configured to allow heat exchange between steam extracted from the steam turbine and the supplied water.

7. The gas turbine plant according to claim 2, wherein:
   the heat absorbing device has a low-boiling-point medium Rankine cycle that is configured to circulate a low-boiling-point medium through repeated condensation and evaporation; and
   the low-boiling-point medium Rankine cycle has an evaporator that is configured to allow heat exchange between the boiler circulation water and the low-boiling-point medium that is a liquid, and heat and evaporate the low-boiling-point medium while cooling the boiler circulation water.

8. The gas turbine plant according to claim 1, wherein:
   the evaporator is a high-pressure evaporator that is configured to heat water having a temperature, which is lower than or equal to a constant-pressure specific heat maximum temperature at which a constant-pressure specific heat is a maximum under a predetermined pressure, to a temperature that is higher than or equal to the constant-pressure specific heat maximum temperature.

9. An operation method for a gas turbine plant, in which the gas turbine plant includes a gas turbine, an exhaust heat recovery boiler configured to generate steam using heat of an exhaust gas from the gas turbine, and a water supply system configured to supply water to the exhaust heat recovery boiler,
   the exhaust heat recovery boiler having: an economizer that is configured to heat the water with the exhaust gas; an evaporator that is configured to heat the water with the exhaust gas and generate steam, the water being heated by the economizer; and a reheater that is configured to heat steam with the exhaust gas introduced from the evaporator,
   the water supply system having a water supply line that is configured to send water from a water supply source to the exhaust heat recovery boiler,
   the operation method comprising
   performing a supplied water temperature regulating process of regulating a temperature of supplied water that is the water flowing along the water supply line,
   wherein the supplied water temperature regulating process has a supplied water heating process to heat the supplied water, and a supplied water cooling process to cool boiler circulation water that is water flowing through the exhaust heat recovery boiler, mix the boiler circulation water after being cooled and the boiler circulation water that is water flowing through the exhaust heat recovery boiler to obtain mixed water, and mix the mixed water with the water flowing the water supply line so as to cool the water flowing into the exhaust heat recovery boiler.

10. The operation method according to claim 9, wherein:
    the gas turbine has a compressor that is configured to compress air, a combustor that is configured to burn fuel in the air compressed by the compressor and generate a combustion gas, and a turbine that is configured to be driven by the combustion gas; and
    the supplied water heating process includes a heat transferring process of transferring heat to the supplied water from a cooling target in the gas turbine, cooling the cooling target, and heating the supplied water.

11. The operation method according to claim 9, wherein the supplied water cooling process includes a heat absorbing process of absorbing heat from the boiler circulation water that has passed through the exhaust heat recovery boiler, making a temperature of the boiler circulation water lower than a temperature of the water of the water supply source, and mixing the boiler circulation water into the supplied water.

12. The operation method according to claim 11, wherein:
    the heat absorbing process includes a Rankine cycle performing process of circulating a low-boiling-point medium in a low-boiling-point medium Rankine cycle; and
    the Rankine cycle performing process includes an evaporating process of allowing heat exchange between the boiler circulation water and the low-boiling-point medium that is a liquid, and heating and evaporating the low-boiling-point medium while cooling the boiler circulation water.

* * * * *